(12) United States Patent
Taherzadeh Boroujeni et al.

(10) Patent No.: US 12,324,018 B2
(45) Date of Patent: Jun. 3, 2025

(54) SOUNDING REFERENCE SIGNAL (SRS) TRIGGERED IN A RANDOM ACCESS CHANNEL (RACH) PROCEDURE

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 17/448,438

(22) Filed: Sep. 22, 2021

(65) Prior Publication Data
US 2022/0124821 A1 Apr. 21, 2022

Related U.S. Application Data

(60) Provisional application No. 63/092,891, filed on Oct. 16, 2020.

(51) Int. Cl.
*H04W 74/0833* (2024.01)
*H04L 5/00* (2006.01)
(Continued)

(52) U.S. Cl.
CPC ....... *H04W 74/0833* (2013.01); *H04L 5/0007* (2013.01); *H04L 5/0048* (2013.01); *H04W 24/08* (2013.01); *H04W 72/1268* (2013.01)

(58) Field of Classification Search
CPC ... H04W 72/20; H04W 4/40; H04W 72/0446; H04W 74/0833; H04W 74/0836; H04W 56/00; H04L 5/0048
See application file for complete search history.

(56) References Cited

U.S. PATENT DOCUMENTS 11,743,948 B2   8/2023  Taherzadeh Boroujeni et al.
2012/0014349 A1*  1/2012  Chung .............. H04W 72/0453
                                         370/329
(Continued)

FOREIGN PATENT DOCUMENTS

WO    WO-2018022782 A1 *  2/2018  ........ H04W 74/0833
WO       2020170352 A1     8/2020
WO       2022078763 A1     4/2022

OTHER PUBLICATIONS

Huawei, et al., "UL Beam Management", 3GPP TSG RAN WG1 Meeting #89, 3GPP Draft, R1-1706925, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017, 6 Pages, May 14, 2017 (May 14, 2017), XP051272155.
(Continued)

*Primary Examiner* — Yee F Lam
(74) *Attorney, Agent, or Firm* — Patterson & Sheridan LLP

(57) ABSTRACT

Certain aspects of the present disclosure provide techniques for transmitting sounding reference signals (SRSs) triggered by a downlink (DL) random access channel (RACH) message (e.g., msg2). A method that may be performed by a user equipment (UE) generally includes receiving a DL RACH message that indicates the UE is to transmit an SRS, transmitting the SRS, in accordance with the indication, and transmitting an uplink (UL) RACH message.

24 Claims, 14 Drawing Sheets

(51) Int. Cl.
    *H04W 24/08*     (2009.01)
    *H04W 72/1268*     (2023.01)

(56) References Cited

U.S. PATENT DOCUMENTS

| | | | |
|---|---|---|---|
| 2017/0302419 A1* | 10/2017 | Liu | H04L 5/0078 |
| 2018/0076946 A1* | 3/2018 | Li | H04W 72/0446 |
| 2018/0097595 A1* | 4/2018 | Huang | H04L 1/0009 |
| 2018/0110074 A1* | 4/2018 | Akkarakaran | H04W 74/0833 |
| 2018/0310257 A1 | 10/2018 | Papasakellariou | |
| 2019/0141773 A1 | 5/2019 | Kim et al. | |
| 2020/0053793 A1* | 2/2020 | Loehr | H04W 72/23 |
| 2021/0409171 A1 | 12/2021 | Henttonen et al. | |
| 2022/0086899 A1 | 3/2022 | Shih et al. | |

OTHER PUBLICATIONS

Intel Corporation: "Details for UL Beam Management", 3GPP TSG-RAN WG1 NR AdHoc #2, 3GPP Draft, R1-1710525 Details for UL Beam Management, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, 9 Pages, Jun. 26, 2017 (Jun. 26, 2017), XP051299732.
International Search Report and Written Opinion—PCT/US2021/071572—ISA/EPO—Jan. 4, 2022.

\* cited by examiner

SOUNDING REFERENCE SIGNAL (SRS) TRIGGERED IN A RANDOM ACCESS CHANNEL (RACH) PROCEDURE

CROSS-REFERENCE TO RELATED APPLICATION

This application claims benefit of and priority to U.S. Provisional Application No. 63/092,891 filed Oct. 16, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for transmitting sounding reference signals (SRSs) triggered by a downlink (DL) random access channel (RACH) message (e.g., Msg2).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure may provide advantages, such as improved coverage enhancement for random access procedures.

Certain aspects of the present disclosure provide a method for wireless communication by a user equipment (UE). The method generally includes receiving a downlink (DL) random access channel (RACH) message that indicates the UE is to transmit a sounding reference signal (SRS), transmitting the SRS, in accordance with the indication, and transmitting the uplink (UL) RACH message. In certain aspects, the SRS is transmitted prior to the UL RACH message. In certain aspects, the SRS is transmitted after transmitting the UL RACH message.

Certain aspects of the present disclosure provide a method for wireless communication by a network entity. The method generally includes transmitting, to a UE, a DL RACH message that indicates the UE is to transmit an SRS; monitoring for the SRS, in accordance with the indication, prior to monitoring for a UL RACH message; and monitoring for the UL RACH message.

Certain aspects of the present disclosure provide an apparatus for wireless communication by a UE. The apparatus generally includes a memory and one or more processors coupled to the memory, the memory and the one or more processors being configured to: receive a DL RACH message that indicates the UE is to transmit a SRS; transmit the SRS in accordance with the indication; and transmit a UL RACH message.

Certain aspects of the present disclosure provide an apparatus for wireless communication by a network entity. The apparatus generally includes a memory and one or more processors coupled to the memory, the memory and the one or more processors being configured to: transmit, to a UE, a DL RACH message that indicates the UE is to transmit an SRS; monitor for the SRS, in accordance with the indication, prior to monitoring for a UL RACH message; and monitor for the UL RACH message.

Certain aspects of the present disclosure provide an apparatus for wireless communication by a UE. The apparatus generally includes means for receiving a DL RACH message that indicates the UE is to transmit a SRS; transmitting the SRS in accordance with the indication; and transmitting a UL RACH message.

Certain aspects of the present disclosure provide an apparatus for wireless communication by a network entity. The apparatus generally includes means for transmitting, to a UE, a DL RACH message that indicates the UE is to transmit an SRS; means for monitoring for the SRS, in accordance with the indication, prior to monitoring for a UL RACH message; and means for monitoring for the UL RACH message.

Certain aspects of the present disclosure provide a non-transitory computer-readable medium comprising executable instructions that, when executed by one or more processors of a UE, cause the UE to: receive a DL RACH message that indicates the UE is to transmit a SRS; transmit the SRS in accordance with the indication; and transmit a UL RACH message.

Certain aspects of the present disclosure provide a non-transitory computer-readable medium comprising executable instructions that, when executed by one or more processors of a network entity, cause the network entity to: transmit, to a UE, a DL RACH message that indicates the UE is to transmit an SRS; monitor for the SRS, in accordance with the indication, prior to monitoring for a UL RACH message; and monitor for the UL RACH message.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure, and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
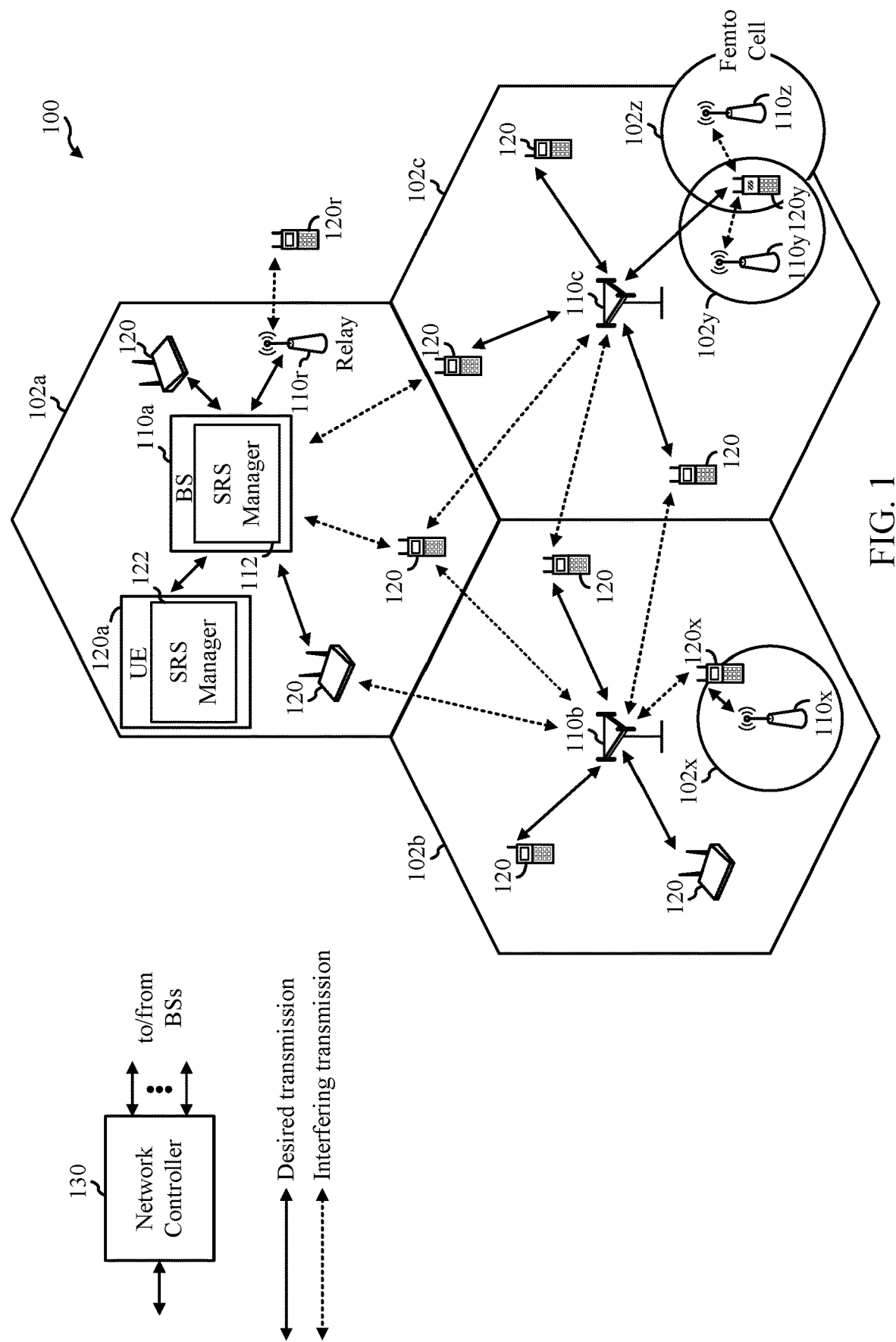
FIG. 1 is a block diagram conceptually illustrating an example telecommunications system, in accordance with certain aspects of the present disclosure.

Aspects of the present disclosure relate to wireless communications, and more particularly, to techniques for transmitting sounding reference signals (SRSs) triggered by a downlink (DL) random access channel (RACH) message (e.g., Msg2).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 megahertz (MHz) or beyond), millimeter wave (mmW) targeting high carrier frequency (e.g., 25 gigahertz (GHz) or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, wireless communication network 100 may include a UE, such as UE 120a (with a sounding reference signal (SRS) manger 122) that may be configured to perform operations 1000 of FIG. 10 to transmit SRSs triggered by a downlink (DL) random access channel (RACH) message (e.g., msg2), in accordance with certain aspects of the present disclosure. Similarly, a base station (BS), such as BS 110a (with an SRS manager 112) may be configured to perform operations 1100 of FIG. 11 to trigger, by a DL RACH message, a UE (e.g., performing operations 1100 of FIG. 10) to transmit an SRS.

As illustrated in FIG. 1, wireless communication network 100 may include a number of BSs 110 and other network entities. A BS 110 may be a station that communicates UEs 120. Each BS 110 may provide communication coverage for a particular geographic area. In 3rd Generation Partnership Project (3GPP), the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, BSs 110 may be interconnected to one another and/or to one or more other BSs 110 or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS 110 may provide communication coverage for a macro cell, a pico cell, a femto cell, and/or other types of cells. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having an association with the femto cell (e.g., UEs 120 in a Closed Subscriber Group (CSG), UEs 120 for users in the home, etc.). A BS 110 for a macro cell may be referred to as a macro BS. A BS 110 for a pico cell may be referred to as a pico BS. A BS 110 for a femto cell may be referred to as a femto BS or a home BS. In the example shown in FIG. 1, BSs 110a, 110b and 110c may be macro BSs for the macro cells 102a, 102b and 102c, respectively. BS 110x may be a pico BS for a pico cell 102x. BSs 110y and 110z may be femto BSs for the femto cells 102y and 102z, respectively. A BS 110 may support one or multiple (e.g., three) cells.

Wireless communication network 100 may also include relay stations. A relay station is a station that receives a transmission of data and/or other information from an upstream station (e.g., BS 110 or UE 120) and sends a transmission of the data and/or other information to a downstream station (e.g., UE 120 or BS 110). A relay station may also be a UE 120 that relays transmissions for other UEs 120. In the example shown in FIG. 1, a relay station 110r may communicate with BS 110a and UE 120r in order to facilitate communication between BS 110a and UE 120r. A relay station may also be referred to as a relay BS, a relay, etc.

Wireless communication network 100 may be a heterogeneous network that includes BSs 110 of different types, e.g., macro BS, pico BS, femto BS, relays, etc. These different types of BSs 110 may have different transmit power levels, different coverage areas, and different impact on interference in wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, BSs 110 may have similar frame timing, and transmissions from different BSs 110 may be approximately aligned in time. For asynchronous operation, BSs 110 may have different frame timing, and transmissions from different BSs 110 may not be aligned in time. The techniques described herein may be used for both synchronous and asynchronous operation.

A network controller 130 may couple to a set of BSs 110 and provide coordination and control for these BSs. Network controller 130 may communicate with BSs 110 via a backhaul. BSs 110 may also communicate with one another (e.g., directly or indirectly) via wireless or wireline backhaul.

UEs 120 (e.g., 120x, 120y, etc.) may be dispersed throughout wireless communication network 100, and each UE 120 may be stationary or mobile. UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs 120 may be considered machine-type communication (MTC) devices or evolved MTC (eMTC) devices. MTC and eMTC UEs include, for example, robots, drones, remote devices, sensors, meters, monitors, location tags, etc., that may communicate with a BS 110, another device (e.g., remote device), or some other entity. A wireless node may provide, for example, connectivity for or to a network (e.g., a wide area network such as Internet or a cellular network) via a wired or wireless communication link. Some UEs 120 may be considered Internet-of-Things (IoT) devices, which may be narrowband IoT (NB-IoT) devices.

Certain wireless networks (e.g., LTE) utilize orthogonal frequency division multiplexing (OFDM) on the DL and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz), and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 RBs), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the UL and DL and include support for half-duplex operation using time division duplexing (TDD). Beamforming may be supported and beam direction may be dynamically configured. MIMO transmissions with precoding may also be supported. Multiple-input multiple-output (MIMO) configurations in the DL may support up to 8 transmit antennas with multi-layer DL transmissions up to 8 streams and up to 2 streams per UE 120. Multi-layer transmissions with up to 2 streams per UE 120 may be supported. Aggregation of multiple cells may be supported with up to 8 serving cells.

In some examples, access to the air interface may be scheduled. A scheduling entity (e.g., BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In FIG. 1, a solid line with double arrows indicates desired transmissions between UE 120 and a serving BS 110, which is a BS 110 designated to serve UE 120 on the DL and/or UL. A finely dashed line with double arrows indicates interfering transmissions between UE 120 and BS 110.

Figure 2:
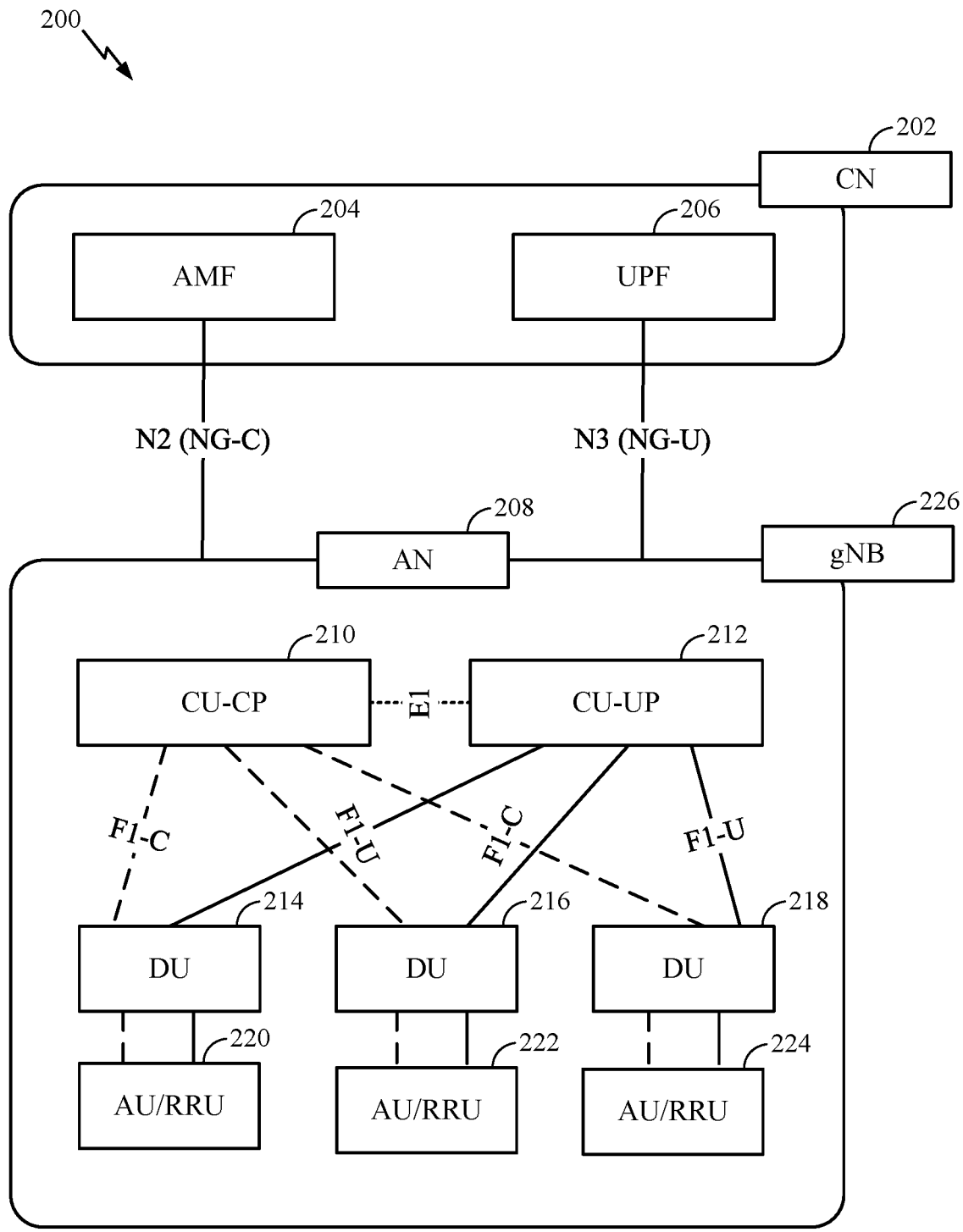
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in wireless communication network 100 illustrated in FIG. 1. As shown in FIG. 2, distributed RAN 200 includes Core Network (CN) 202 and Access Node (AN) 208.

CN 202 may host core network functions. CN 202 may be centrally deployed. CN 202 functionality may be offloaded (e.g., to advanced wireless services (AWS)), in an effort to handle peak capacity. CN 202 may include the Access and Mobility Management Function (AMF) 204 and User Plane Function (UPF) 206. AMF 204 and UPF 206 may perform one or more of the core network functions.

AN 208 may communicate with CN 202 (e.g., via a backhaul interface). AN 208 may communicate with AMF 204 via an N2 (e.g., NG control plane (NG-C)) interface. AN 208 may communicate with UPF 208 via an N3 (e.g., NG user plane (NG-U)) interface. AN 208 may include a central unit-control plane (CU-CP) 210, one or more central unit-user planes (CU-UPs) 212, one or more distributed units (DUs) 214-218, and one or more Antenna/Remote Radio Units (AU/RRUs) 220-224. The CUs and DUs may also be referred to as gNB-CUs and gNB-DUs, respectively. One or more components of AN 208 may be implemented in a gNB 226. AN 208 may communicate with one or more neighboring gNBs.

CU-CP 210 may be connected to one or more of DUs 214-218. CU-CP 210 and DUs 214-218 may be connected via an F1-C interface. As shown in FIG. 2, CU-CP 210 may be connected to multiple DUs 214-218, but the DUs may be connected to only one CU-CP, CU-CP 210. Although FIG. 2 only illustrates one CU-UP 212, AN 208 may include multiple CU-UPs. CU-CP 210 selects the appropriate CU-UP(s) 212 for requested services (e.g., for a UE 120).

CU-UP(s) 212 may be connected to CU-CP 210. For example, CU-UP(s) 212 and CU-CP 210 may be connected via an E1 interface. CU-UP(s) 212 may connected to one or more of DUs 214-218. CU-UP(s) 212 and DUs 214-218 may be connected via a F1-U interface. As shown in FIG. 2, CU-CP 210 may be connected to multiple CU-Ups 212, but CU-UPs 212 may be connected to only one CU-CP 210.

A DU, such as DUs 214, 216, and/or 218, may host one or more transmission reception points (TRPs) (which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP 210 (e.g., for RAN sharing, radio as a service (RaaS), and service specific deployments). DUs may be configured to individually (e.g., dynamic selection) or jointly (e.g., joint transmission) serve traffic to a UE 120. Each DU 214-218 may be connected with one of AU/RRUs 220-224.

CU-CP 210 may be connected to multiple DU(s) that are connected to (e.g., under control of) the same CU-UP 212. Connectivity between a CU-UP 212 and a DU may be established by CU-CP 210. For example, the connectivity between the CU-UP 212 and a DU may be established using Bearer Context Management functions. Data forwarding between CU-UP(s) 212 may be via an Xn-U interface.

Distributed RAN 200 may support fronthauling solutions across different deployment types. For example, RAN 200 architecture may be based on transmit network capabilities (e.g., bandwidth, latency, and/or jitter). Distributed RAN 200 may share features and/or components with LTE. For example, AN 208 may support dual connectivity with NR and may share a common fronthaul for LTE and NR. Distributed RAN 200 may enable cooperation between and among DUs 214-218, for example, via CU-CP 210. An inter-DU interface may not be used.

Logical functions may be dynamically distributed in distributed RAN 200. As will be described in more detail with reference to FIG. 3, a Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in AN 208 and/or UE 120.

Figure 3:
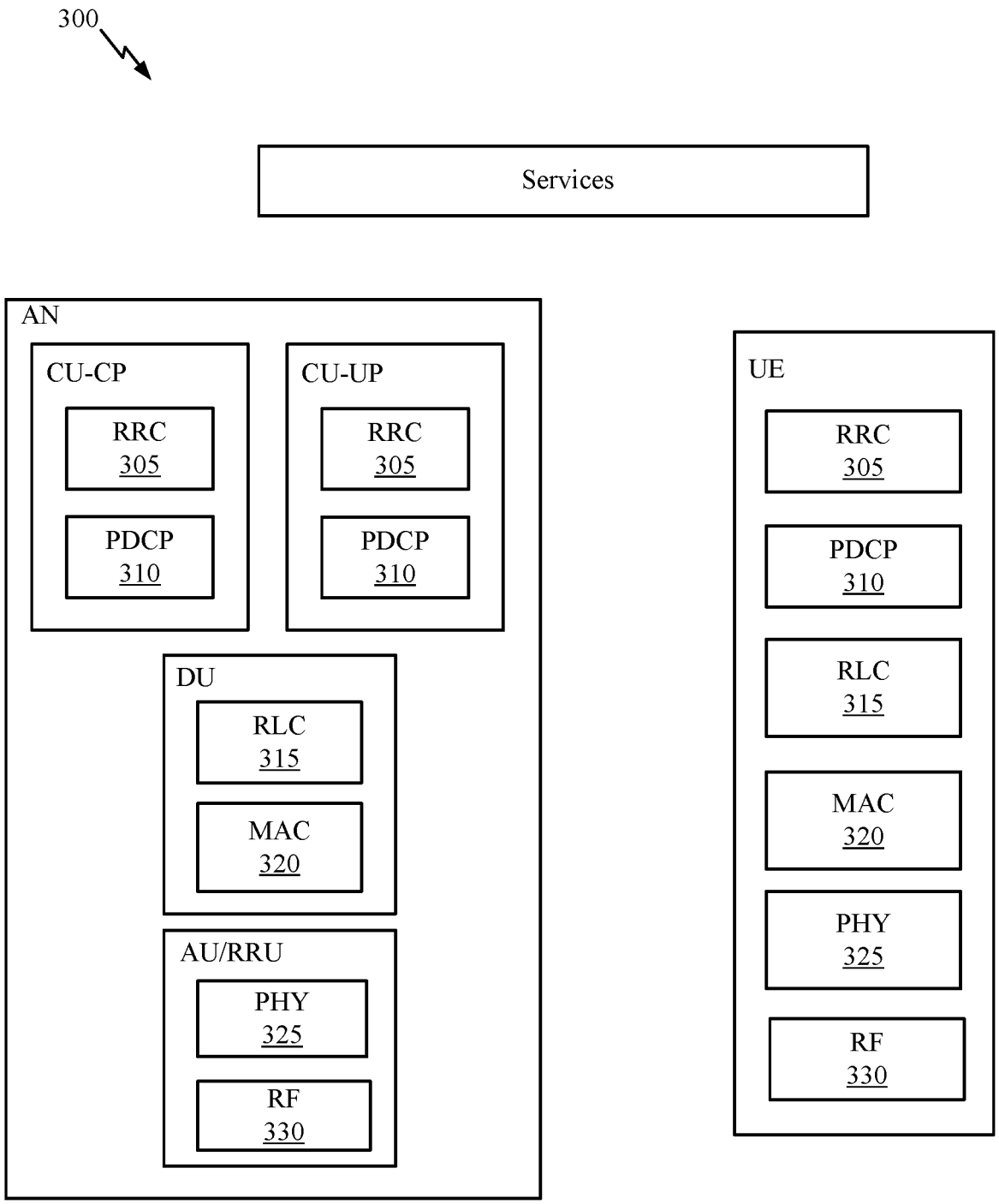
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), in accordance with certain aspects of the present disclosure. The illustrated communications protocol stack 300 may be implemented by devices operating in a wireless communication system, such as a 5G NR system (e.g., wireless communication network 100). In various examples, the layers of protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE 120. As shown in FIG. 3, the system may support various services over one or more protocols. One or more protocol layers of protocol stack 300 may be implemented by an AN (e.g., AN 208 in FIG. 2) and/or a UE (e.g., UE 120 in FIG. 1).

As shown in FIG. 3, protocol stack 300 is split in the AN (e.g., AN 208 in FIG. 2). RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP (e.g., CU-UP 212 in FIG. 2) each may implement RRC layer 305 and PDCP layer 310. A DU (e.g., DUs 214-218 in FIG. 2) may implement the RLC layer 315 and MAC layer 320. The AU/RRU (e.g., AU/RRUs 220-224 in FIG. 2) may implement PHY layer(s) 325 and RF layer(s) 330. PHY layers 325 may include a high PHY layer and a low PHY layer.

The UE (e.g., UE 120 in FIG. 1) may implement the entire communications protocol stack 300 (e.g., RRC layer 305, PDCP layer 310, RLC layer 315, MAC layer 320, PHY layer(s) 325, and RF layer(s) 330).

Figure 4:
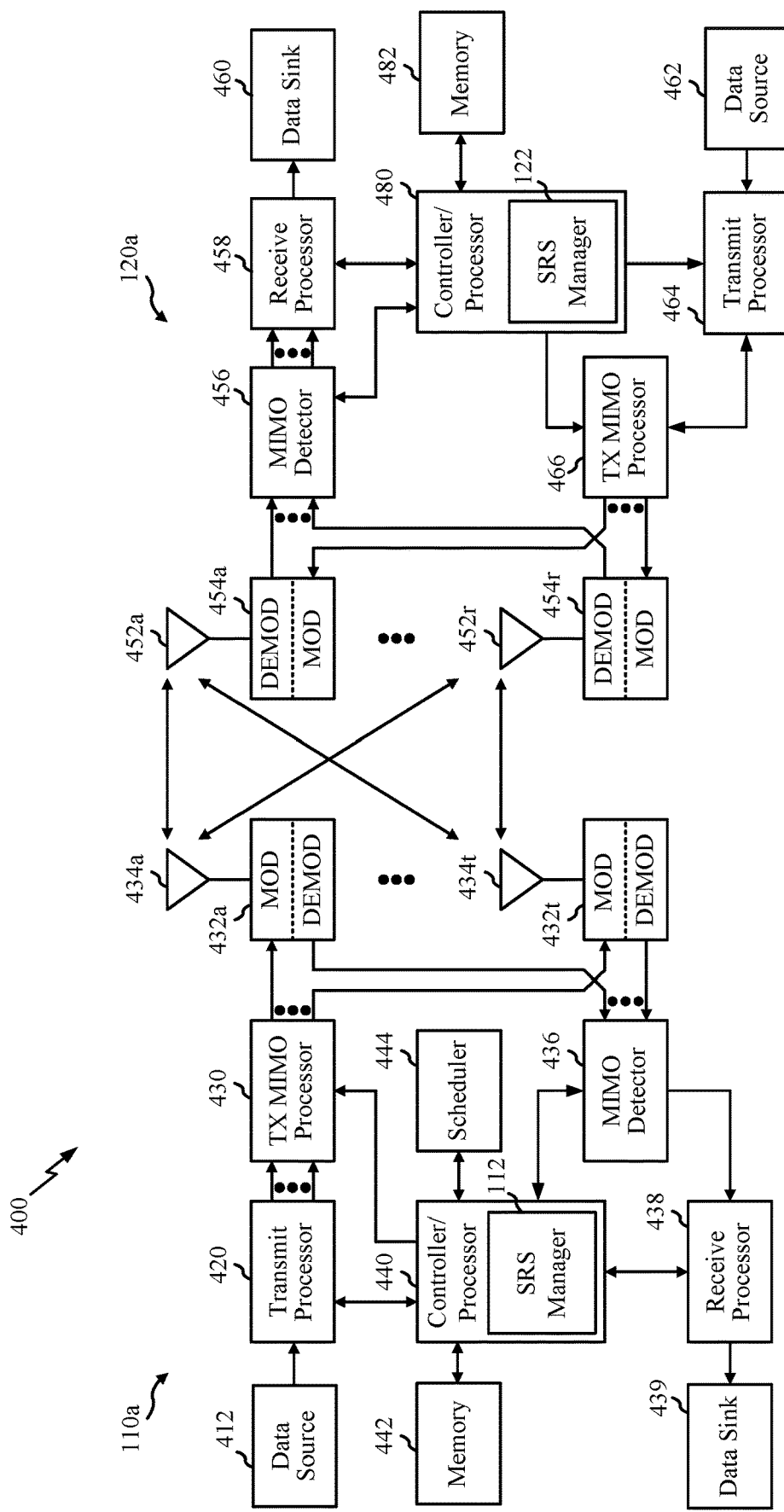
FIG. 4 is a block diagram conceptually illustrating example components of a base station (BS) and a user equipment (UE), in accordance with certain aspects of the present disclosure.

FIG. 4 is a block diagram illustrating example components of BS 110a and UE 120a (as depicted in FIG. 1), which may be used to implement aspects of the present disclosure. For example, antennas 452, processors 466, 458, 464, and/or controller/processor 480 (including SRS manager 122) of UE 120a may be configured to perform operations 1000 described with respect to FIG. 10, while similar processors (including SRS manager 112) of BS 110a may be configured to perform operations 1100 described with respect to FIG. 11.

At BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. Processor 420 may process (e.g., encode and symbol map) the data and control information to obtain data symbols and control symbols, respectively. Processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators 432a through 432t may be transmitted via the antennas 434a through 434t, respectively.

At UE 120a, antennas 452a through 452r may receive the DL signals from the BS 110a and may provide received signals to demodulators (DEMODs) in transceivers 454a through 454r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a through 454r, perform MIMO detection on the received symbols if applicable, and provide detected symbols. A receive processor 458 may process (e.g., demodulate, deinterleave, and decode) the detected symbols, provide decoded data for UE 120a to a data sink 460, and provide decoded control information to controller/processor 480.

On the UL, at UE 120a, a transmit processor 464 may receive and process data (e.g., for the physical uplink shared channel (PUSCH)) from a data source 462 and control information (e.g., for the physical uplink control channel (PUCCH) from controller/processor 480. Transmit processor 464 may also generate reference symbols for a reference signal (RS) (e.g., for the SRS). The symbols from transmit processor 464 may be precoded by a TX MIMO processor 466 if applicable, further processed by demodulators in transceivers 454a through 454r (e.g., for SC-FDM, etc.), and transmitted to BS 110a. At BS 110a, the UL signals from UE 120a may be received by antennas 434, processed by modulators 432, detected by MIMO detector 436 if applicable, and further processed by receive processor 438 to obtain decoded data and control information sent by UE 120a. Receive processor 438 may provide the decoded data to a data sink 439 and the decoded control information to controller/processor 440.

Controllers/processors 440 and 480 may direct the operation at BS 110a and UE 120a, respectively. Processor 440 and/or other processors and modules at BS 110a may perform or direct the execution of processes for the techniques described herein. Memories 442 and 482 may store data and program codes for BS 110a and UE 120a, respectively. A scheduler 444 may schedule UE 120a for data transmission on the DL and/or UL.

Figure 5:
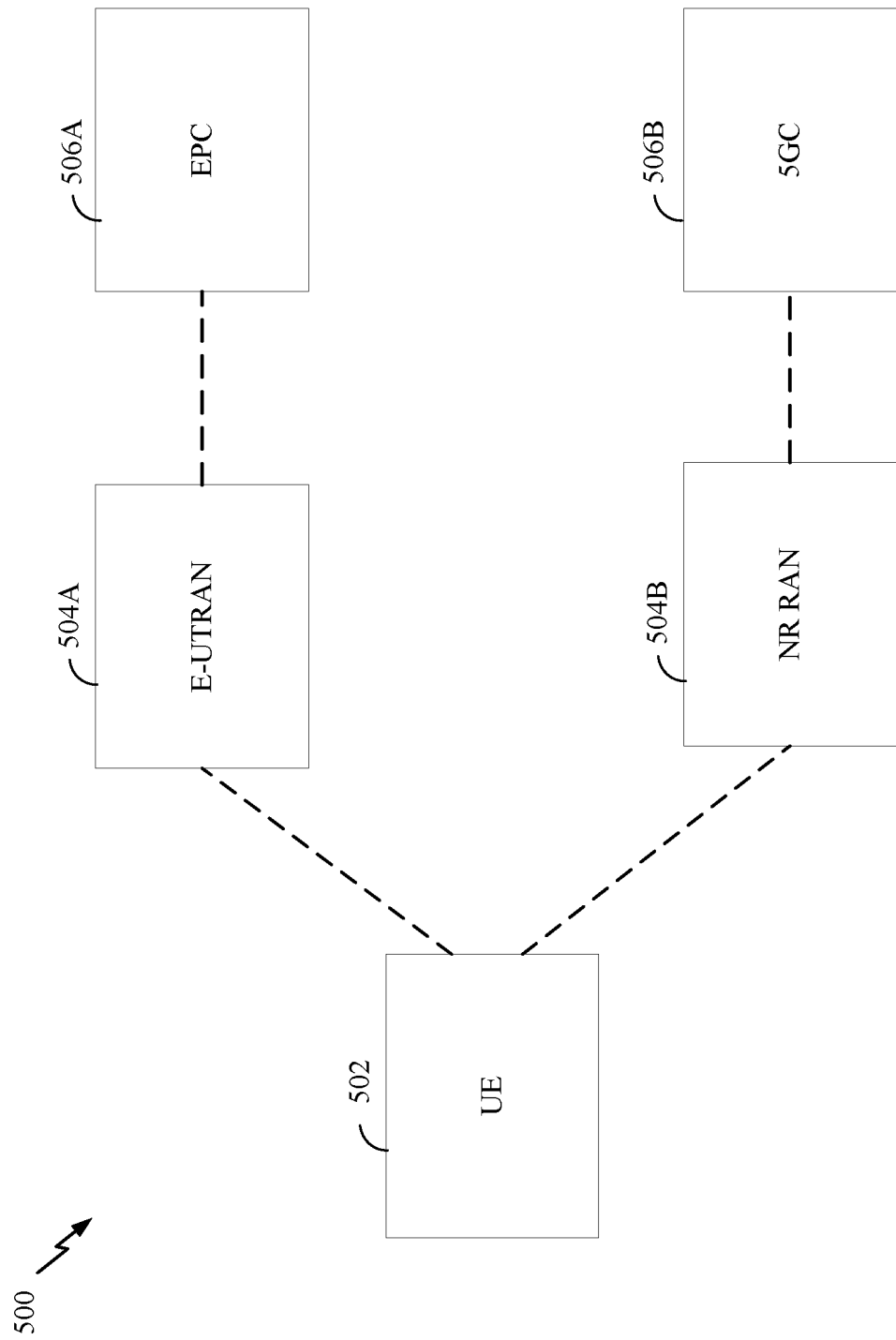
FIG. 5 illustrates an example system architecture for interworking between a 5G System (5GS) and an evolved universal mobile telecommunication system network (E-UTRAN) system, in accordance with certain aspects of the present disclosure.

FIG. 5 illustrates an example system architecture 500 for interworking between 5G System (5GS) (e.g., such as the distributed RAN 200) and an evolved universal mobile telecommunication system network (E-UTRAN) system, in accordance with certain aspects of the present disclosure. As shown in FIG. 5, the UE 502 (e.g., UE 120a in FIG. 1 and FIG. 4) may be served by separate RANs 504A and 504B controlled by separate core networks 506A and 506B (e.g., evolved packet core (EPC) network 506A and 5G core (5GC) network), where RAN 504A provides E-UTRA services and RAN 504B provides 5G NR services. UE 502 may operate under only one RAN/CN or both RANs/CNs at a time.

In LTE, the basic transmission time interval (TTI) or packet duration is the 1 millisecond (ms) subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing (SCS) of 15 KHz and other SCS may be defined with respect to the base subcarrier spacing, for example, 30 kHz, 60 kHz, 120 kHz, 240 kHz, etc. The symbol and slot lengths scale with the SCS. The CP length also depends on the SCS.

Figure 6:
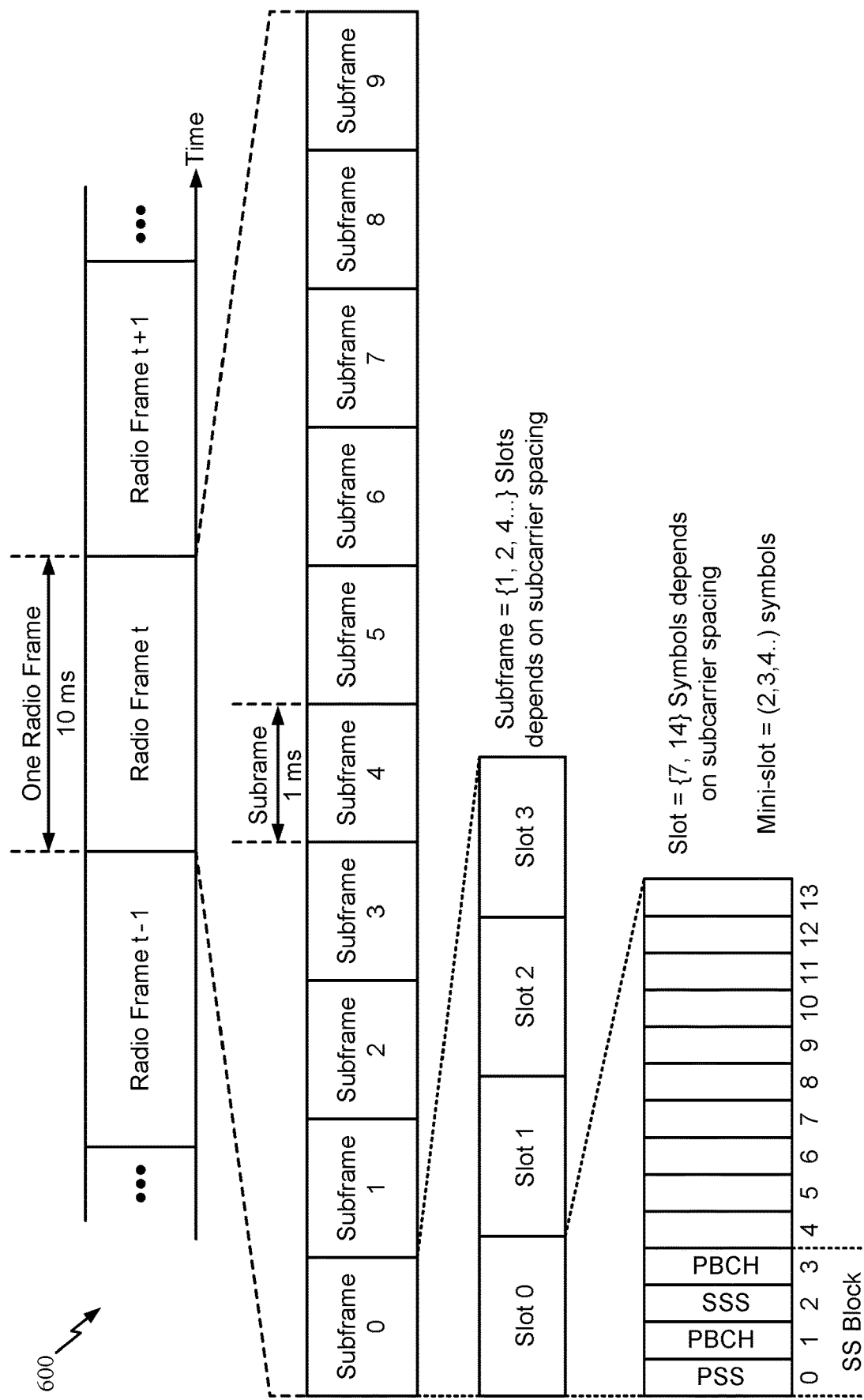
FIG. 6 is a block diagram illustrating an example of a frame format for a new radio (NR), in accordance with certain aspects of the present disclosure.

FIG. 6 is a diagram showing an example of a frame format 600 for NR, in accordance with certain aspects of the present disclosure. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a TTI having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. The SSB includes a PSS, an SSS, and a two symbol PBCH. The SSB can be transmitted in a fixed slot location, such as the symbols 0-3 as shown in FIG. 6. The PSS and SSS may be used by UEs 120 for cell search and acquisition. The PSS may provide half-frame timing, and the SSS may provide the CP length and frame timing. The PSS and SSS may provide the cell identity. The PBCH carries some basic system information, such as DL system bandwidth, timing information within radio frame, synchronization signal (SS) burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmW. The up to sixty-four transmissions of the SSB are referred to as the SS burst set. SSBs in an SS burst set are transmitted in the same frequency region, while SSBs in different SS bursts sets can be transmitted at different frequency locations.

In some circumstances, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum).

A UE (e.g., UE 120a in FIG. 1 and FIG. 4) may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN (e.g., AN 208 in FIG. 2), or a DU (e.g., one of DUs 214-218 in FIG. 2), or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Random Access Channel (RACH)
Procedures

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, the RACH may be used for initial access to a network when the UE switches from a radio resource control (RRC) connected idle mode to an active mode, or when handing over in RRC connected mode. Moreover, the RACH may be used for downlink (DL) and/or uplink (UL) data arrival when the UE is in RRC idle or RRC inactive modes, and when reestablishing a connection with the network.

Figure 7:
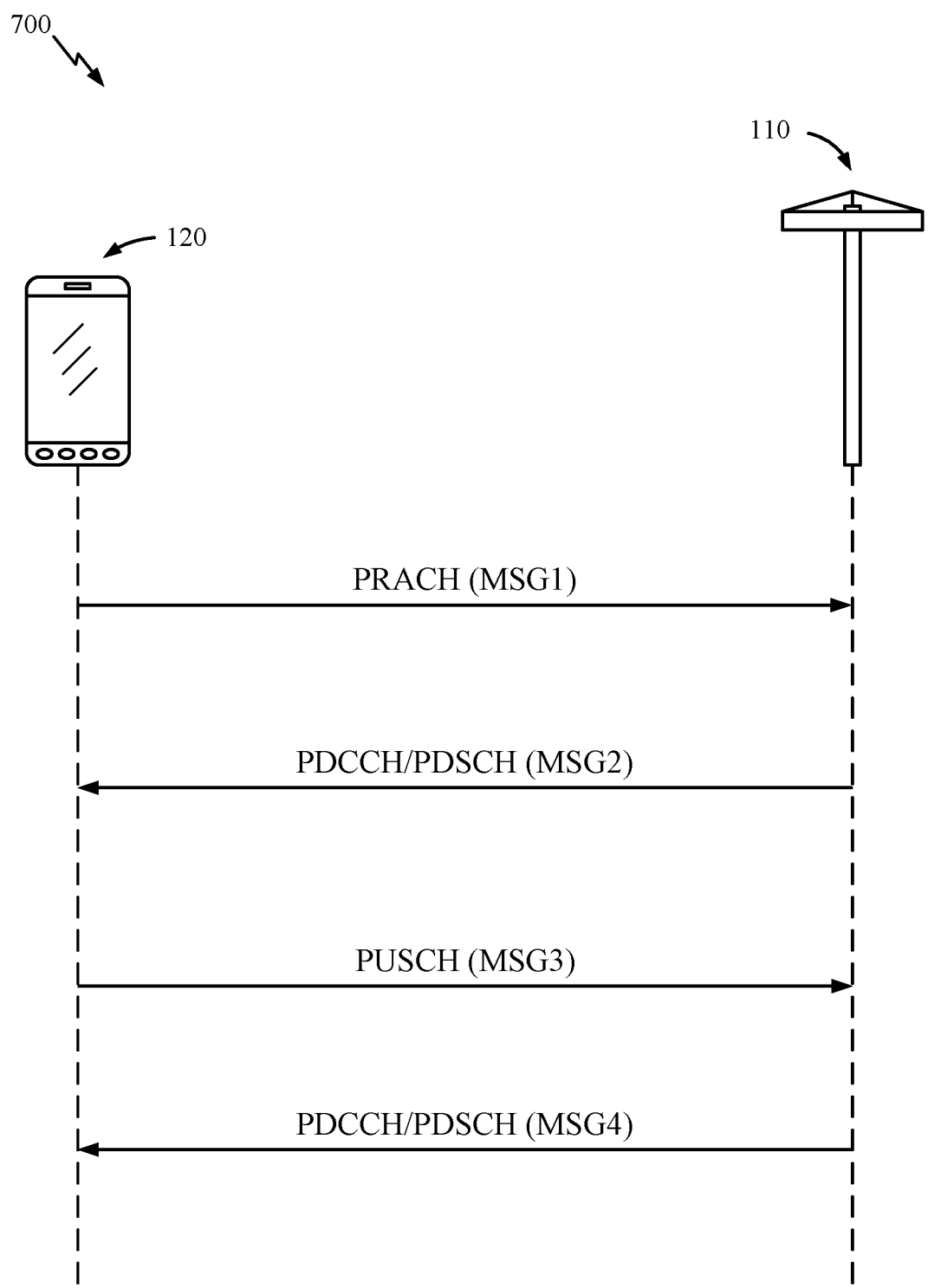
FIG. 7 is a call flow diagram illustrating an example four-step random access channel (RACH) procedure, in accordance with certain aspects of the present disclosure.

FIG. 7 is a call flow diagram 700 illustrating an example four-step RACH procedure, in accordance with certain aspects of the present disclosure. A first message (e.g., message 1 (MSG1)) may be transmitted from UE 120 to BS 110 on the physical random access channel (PRACH). In this case, MSG1 may only include a RACH preamble. BS 110 may respond with a random access response (RAR) message (e.g., message 2 (MSG2), also referred to herein as Msg2) which may include the identifier (ID) of the RACH preamble, a timing advance (TA), an UL grant, cell radio network temporary identifier (C-RNTI), and a back off indicator. MSG2 may include a physical downlink control channel (PDCCH or MSG2 PDCCH) communication including control information (indicating RB resources to monitor) for a following communication on the physical downlink shared channel (PDSCH or MSG2 PDSCH), as illustrated. In response to MSG2, a third message (MSG3) (also referred to herein as Msg3) is transmitted from UE 120 to BS 110 on a physical uplink shared channel (PUSCH). MSG3 may include one or more of a RRC connection request, a tracking area update request, a system information request, a positioning fix or positioning signal request, or a scheduling request. BS 110 then responds with a fourth message (MSG 4) which may include a contention resolution message.

In some cases, to speed up access, a two-step RACH procedure may be supported. As the name implies, the two-step RACH procedure may effectively "collapse" the four messages of the four-step RACH procedure into two messages.

Figure 8:
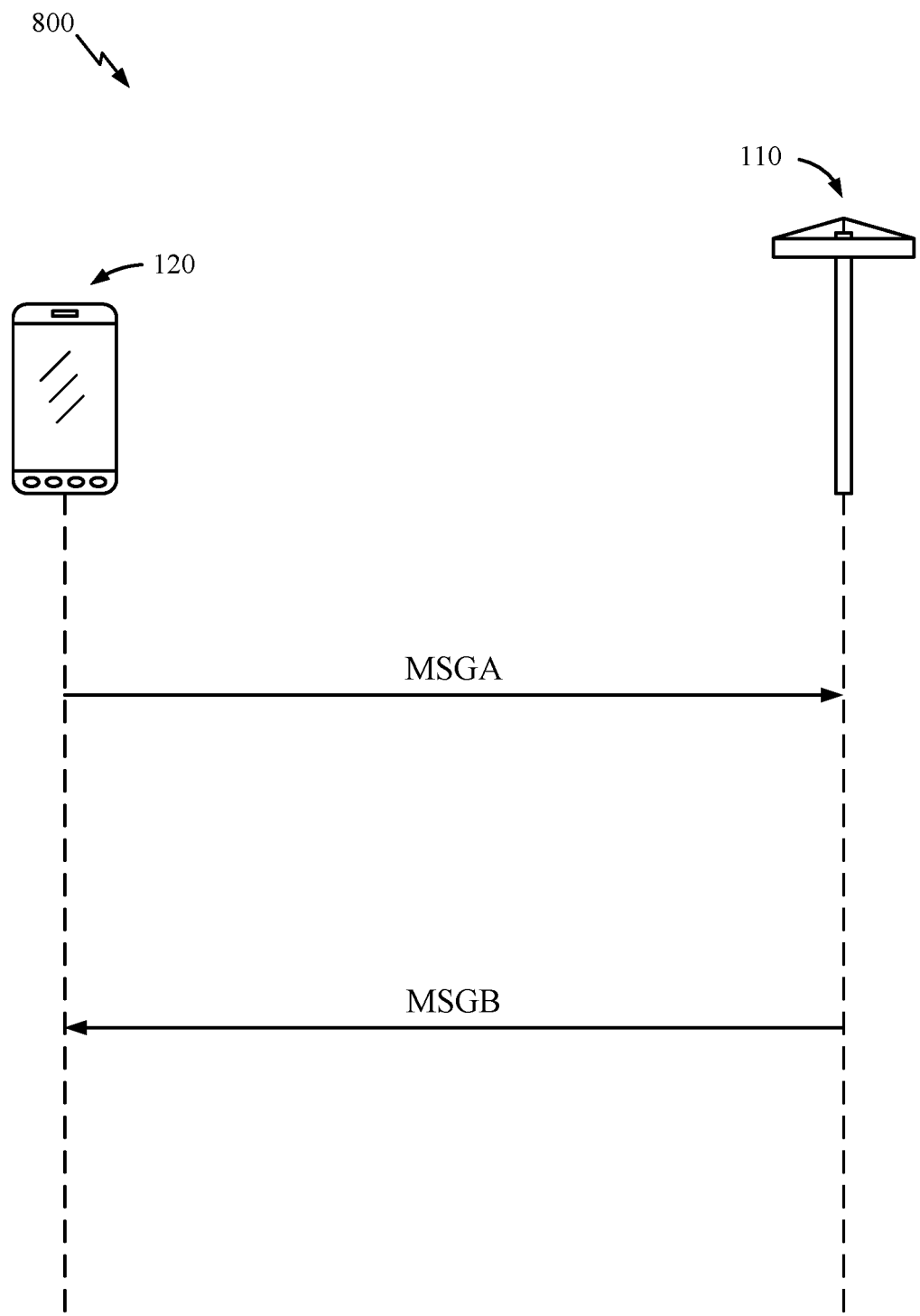
FIG. 8 is a call flow diagram illustrating an example two-step RACH procedure, in accordance with certain aspects of the present disclosure.

FIG. 8 is a call flow diagram 800 illustrating an example two-step RACH procedure, in accordance with certain aspects of the present disclosure. A first enhanced message (MSGA) may be sent from UE 120 to BS 110. In certain aspects, MSGA includes some or all the information from MSG1 and MSG3 from the four-step RACH procedure (e.g., as shown in FIG. 7), effectively combining MSG1 and MSG3. For example, MSGA may include MSG1 and MSG3 multiplexed together such as using one of time-division multiplexing (TDM) or frequency-division multiplexing (FDM). In certain aspects, MSGA includes a RACH preamble for random access and a payload. The MSGA payload, for example, may include the UE-ID and other signaling information (e.g., buffer status report (BSR)) or a scheduling request (SR). BS 110 may respond with an RAR message (MSGB) which may effectively combine MSG2 and MSG4 (e.g., described above with respect to FIG. 7). For example, MSGB may include the ID of the RACH preamble, a TA, a back off indicator, a contention resolution message, an UL/DL grant, and transmit power control (TPC) commands.

In a two-step RACH procedure, the MSGA may include a RACH preamble and a payload. In some cases, the RACH preamble and payload may be sent in an MSGA transmission occasion.

The random access message (MSGA) transmission occasion generally includes an MSGA preamble occasion (for transmitting a preamble signal) and an msgA payload occasion for transmitting a PUSCH. The MSGA preamble transmission generally involves:

(1) selection of a preamble sequence; and
(2) selection of a preamble occasion in time/frequency domain (for transmitting the selected preamble sequence).

The msgA payload transmission generally involves:
(1) construction of the random access message payload (demodulation reference signal (DMRS)/PUSCH); and
(2) selection of one or multiple PUSCH resource units (PRUs) in time/frequency domain to transmit this message (payload).

In some cases, a UE monitors SSB transmissions which are sent (by a gNB using different beams) and are associated with a finite set of time/frequency resources defining RACH occasions (ROs) and PRUs. As will be described in greater detail below, upon detecting an SSB, the UE may select an RO and one or more PRUs associated with that SSB for an MSGA transmission. The finite set of ROs and PRUs may help reduce monitoring overhead (blind decodes) by a BS.

There are several benefits to a two-step RACH procedure, such as speed of access and the ability to send a relatively small amount of data without the overhead of a full four-step RACH procedure to establish a connection (when the four-step RACH messages may be larger than the payload).

The two-step RACH procedure can operate in any RRC state and any supported cell size. Networks that uses two-step RACH procedures can typically support contention-based random access (CBRA) transmission of messages (e.g., MSGA) within a finite range of payload sizes and with a finite number of modulation and coding scheme (MCS) levels.

Various technologies may be the focus of current wireless communication standards. For example, Release 15 (Rel-15) and/or Release 16 (Rel-16) may focus on premium smart-phones (e.g., enhanced mobile broadband (eMBB)), and other verticals such as ultra-reliable low latency communication (URLLC) and/or vehicle-to-everything (V2X) communications. In some wireless communication standards (e.g., Release 17 (Rel-17) and beyond) there may exist a strong desire for new radio (NR) to be scalable and deployable in a more efficient and cost-effective way. Thus, a new UE type with reduced capabilities (RedCap) has been introduced. In particular, a RedCap UE may exhibit a general relaxation of peak throughput, as well as lower latency and/or reliability requirements.

Figure 9:
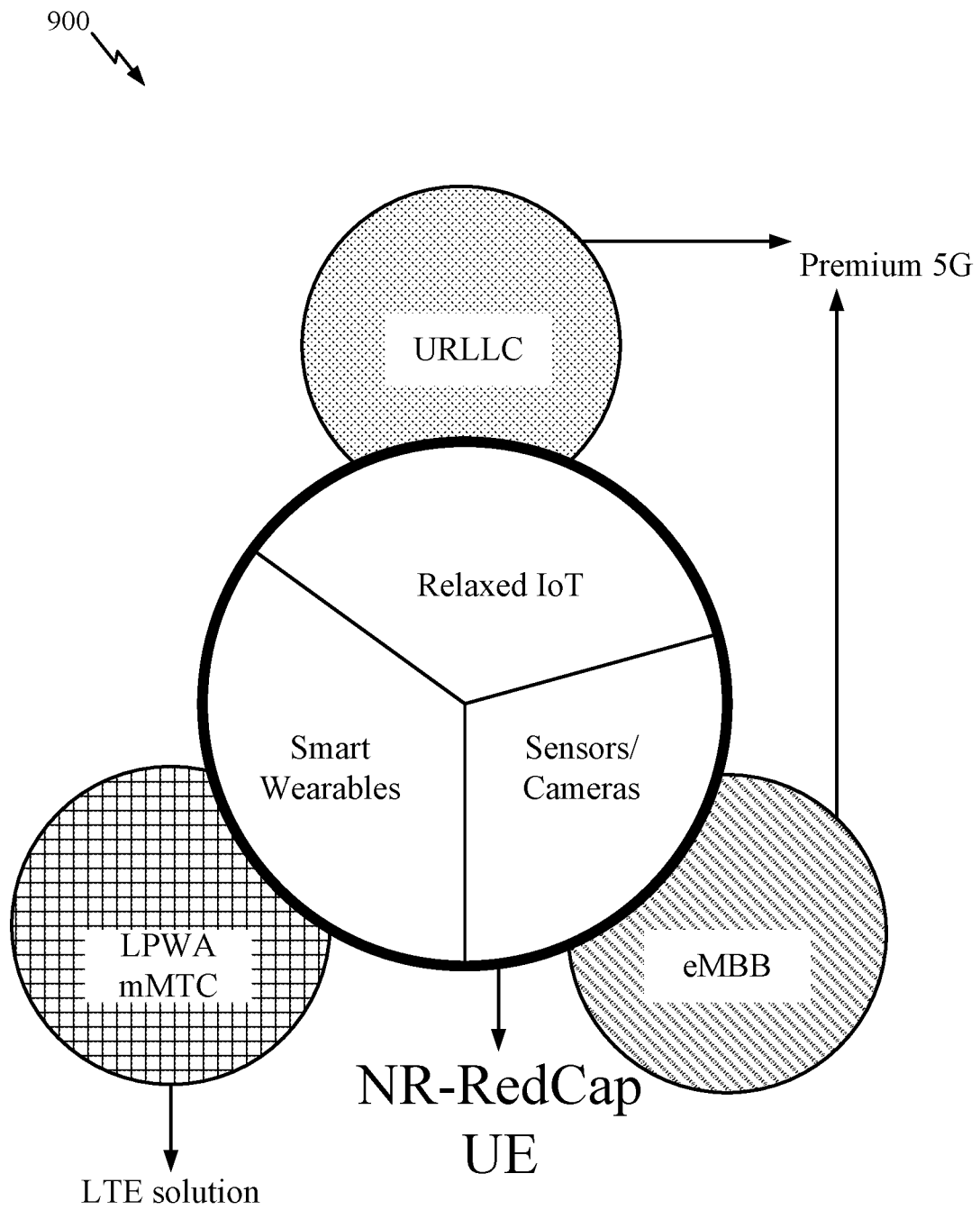
FIG. 9 is a diagram illustrating example functionality of reduced capability (RedCap) UEs, in accordance with certain aspects of the present disclosure.

Thus, some design objectives of the NR RedCap UE may include scalable resource allocation, coverage enhancement for DL and/or UL, power saving in all RRC states, and/or co-existence with the NR premium UE. As shown in FIG. 9, an NR-RedCap UE may be a smart wearable device, a sensor/camera, or any other device configured for relaxed internet-of-things (IoT) communications. Further, functionality and/or capability of a RedCap UE may overlap with those of long term evolution (LTE) and/or 5G devices (e.g., premium 5G devices). For example, the functionality of relaxed IoT devices may overlap with that of URLLC devices, the functionality of smart wearable devices may overlap with that of low power wide area (LPWA) massive machine type communication (mMTC) devices, and/or the functionality of sensors/cameras may overlap with that of eMBB devices.

Example Sounding Reference Signal (SRS)
Triggered in a Random Access Channel (RACH)
Procedure Aspects of the present disclosure provide techniques for transmitting sounding reference signals (SRSs) triggered by a downlink (DL) random access channel (RACH) message. For example, the SRS may be triggered by an Msg2 for a 4-step RACH procedure (such as the four-step RACH procedure illustrated in FIG. 7). The SRS transmissions may help a network entity (e.g., base station (BS) such as a next generation NodeB (gNB)) perform uplink (UL) timing tracking, beam management, and/or perform link adaptation.

The techniques presented herein may be applied in various bands utilized for New Radio (NR). For example, for the higher band referred to as frequency range 4 (FR4) (e.g., 52.6 gigahertz (GHz)-114.25 GHz), an orthogonal frequency division multiplexing (OFDM) waveform with very large subcarrier spacing (SCS) (960 kilohertz (kHz)-3.84 megahertz (MHz)) may be required to combat severe phase noise (PN). Due to the large SCS, the slot length tends to be very short. In a lower band referred to as frequency range 2 (FR2) (24.25 GHz to 52.6 GHz) with 120 kHz SCS, the slot length is 125 μSec, while in frequency range 4 (FR4) with 960 kHz, the slot length is 15.6 μSec.

In general, physical RACH (PRACH), a Msg2 physical downlink control channel (PDCCH), and Msg3 physical uplink shared channel (PUSCH) messages may experience coverage issues. This may be especially true for FR2, in which channel conditions may change rapidly for directional transmissions (sent with different beams). In some implementations, beam refinement is a possible approach to improve the received signal power (e.g., by having more beamforming gains for the beam). Beam refinement can be done at the gNB or UE for transmission or reception.

Various methods for beam refinement at the gNB (e.g., based on the reception of multiple copies of a UL signal via different refined beams) may be employed. For example, for reception of multiple copies of one PRACH via different refined beams, a refined beam for transmission of Msg2 PDCCH (and Msg2) and reception of Msg3 may be selected. In some cases, channel state information (CSI) reference signals (RSs) (CSI-RSs) (or other RSs) may be scheduled by a remaining system information (RMSI) PDCCH to help in UE-side beam refinement. In some cases, transmitting a frontloaded preamble or RS together with the transmission of the Msg3 PUSCH may also help with beam refinement.

In NR, SRS is used for UL sounding. In some cases, a given SRS resource can be configured as aperiodic, periodic, or semi-persistent. Periodic resources are configured with a slot-level periodicity and/or a slot-offset. Semi-persistent resources are configured with a slot-level periodicity and/or a slot-offset.

In some cases, the semi-persistent resources are activated/deactivated by a media access control (MAC) control element (CE) (MAC-CE), and multiple SRS resources can be activated/deactivated with a single message. Aperiodic resources are configured without a slot-level periodicity and slot offset. For aperiodic resources, downlink control information (DCI) (e.g., scheduling DL and/or UL) contains an SRS request field (e.g., 2-bits). In some cases, a group common (GC) DCI can be used to trigger an aperiodic SRS resource set.

Furthermore, aperiodic SRS resource(s) may be triggered on a per-set basis by DCI, and multiple SRS resources can be triggered with a single DCI message. Moreover, a codepoint of the SRS request field in DCI can be mapped to one or more SRS resource sets, and one state of the field that can be used to select at least one SRS resource out of the configured SRS resources. It should be noted that for periodic/semi-persistent, different resources may have different periodicities and/or slot offsets.

In some cases, a UE can be configured with one or more (e.g., K≥1) SRS resources where a given X-port SRS resource spans N=1, 2, or 4 adjacent symbols within a slot (e.g., where X is an integer all X ports are mapped to each symbol of the resource) and/or $C_{SRS}$ and $B_{SRS}$ (for controlling bandwidth allocated to SRS) are configurable in a UE-specific way. For slot periodicity, various numbers of slots (e.g., 1, 2, 5, 10, 20, 40, 80, 160, 320, 640, 1280, or 2560 slots) can be supported for all various SCSs.

Additionally, NR generally supports configuration of an X-port (e.g., X≤4) SRS resource spanning N (e.g., N=1, 2, or 4) adjacent orthogonal frequency division multiplexing (OFDM) symbols within the same slot. In some cases, a gNB would configure SRS resources in the time domain only by UE-specific parameters (e.g., by SRS-SlotConfig, SRS-ResourceMapping).

When only repetition is configured, the X ports are mapped to each symbol of the resource and within the resource, and each of the X ports are mapped to the same set of subcarriers in the same set of physical resource blocks (PRBs) in the N SRS symbols. When only frequency hopping is configured, the X ports are mapped to potentially different sets of subcarriers in each OFDM symbol of the resource (e.g., depending on a frequency hopping pattern).

However, coverage enhancement for RACH messages via beam refinement and/or enhanced CSI may still be provided. Accordingly, certain aspects provide for a UE to transmit an SRS which is triggered by a DL RACH. For example, a gNB may signal an indication that a UE is to transmit SRS before (or after) an Msg3 PUSCH (described above with respect to FIG. 7). In some cases, the indication triggering SRS transmission (e.g., before Msg3) may be accomplished by the UE receiving a DL RACH message (e.g., Msg2 and/or Msg2 PDCCH).

Figure 10:
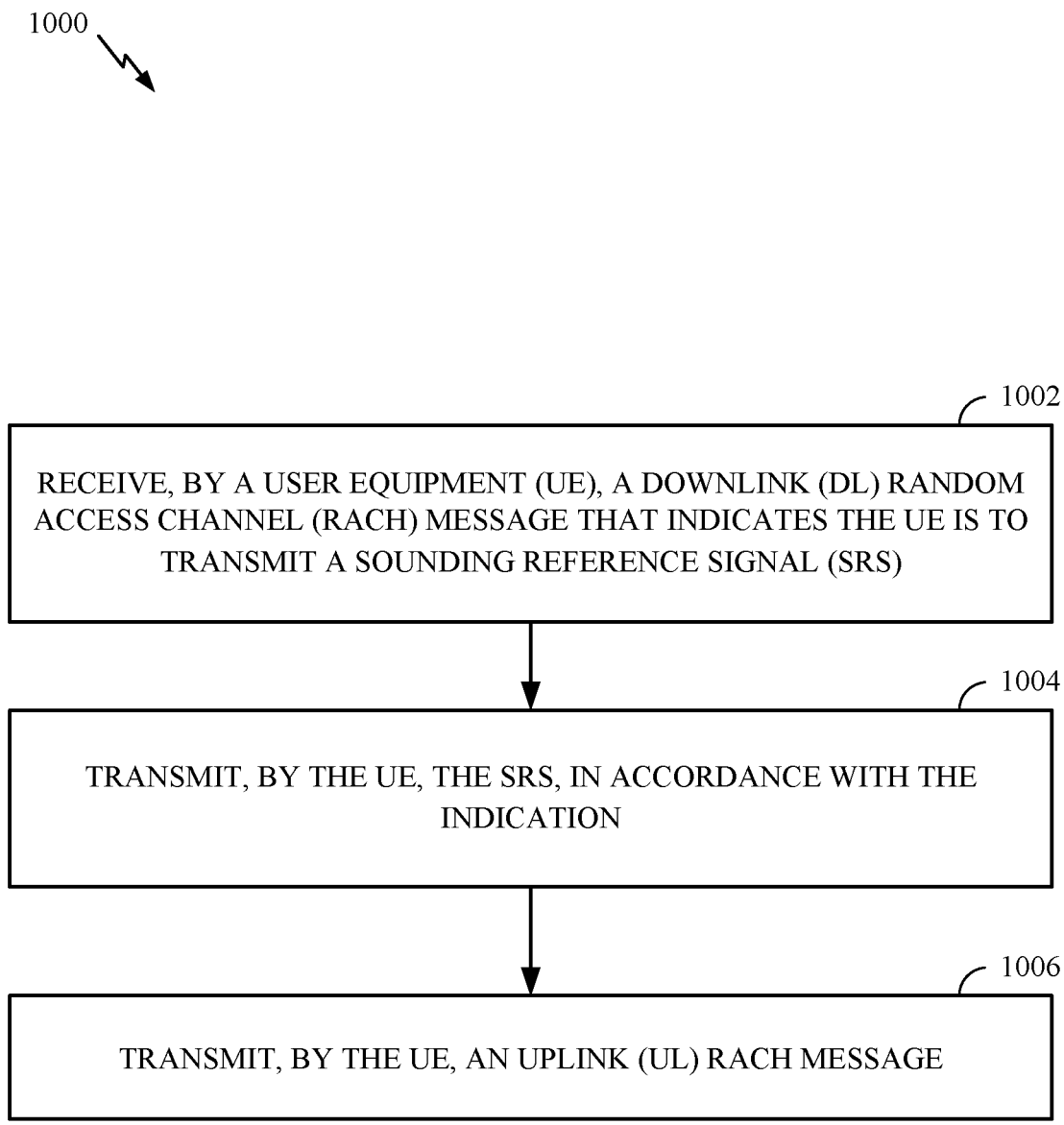
FIG. 10 is a flow diagram illustrating example operations for wireless communication by a UE, in accordance with certain aspects of the present disclosure.

FIG. 10 illustrates example operations 1000 for wireless communication by a UE, in accordance with certain aspects of the present disclosure. Operations 1000 may be performed, for example, by UE 120a in wireless communication network 100.

Operations 1000 begin, at 1002, by the UE receiving a DL RACH message that indicates the UE is to transmit an SRS.

At 1004, the UE transmits the SRS, in accordance with the indication. At 1006, the UE transmits a UL RACH message. As will be described below, the SRS may be transmitted prior to transmitting the UL RACH message (e.g., Msg3).

Figure 11:
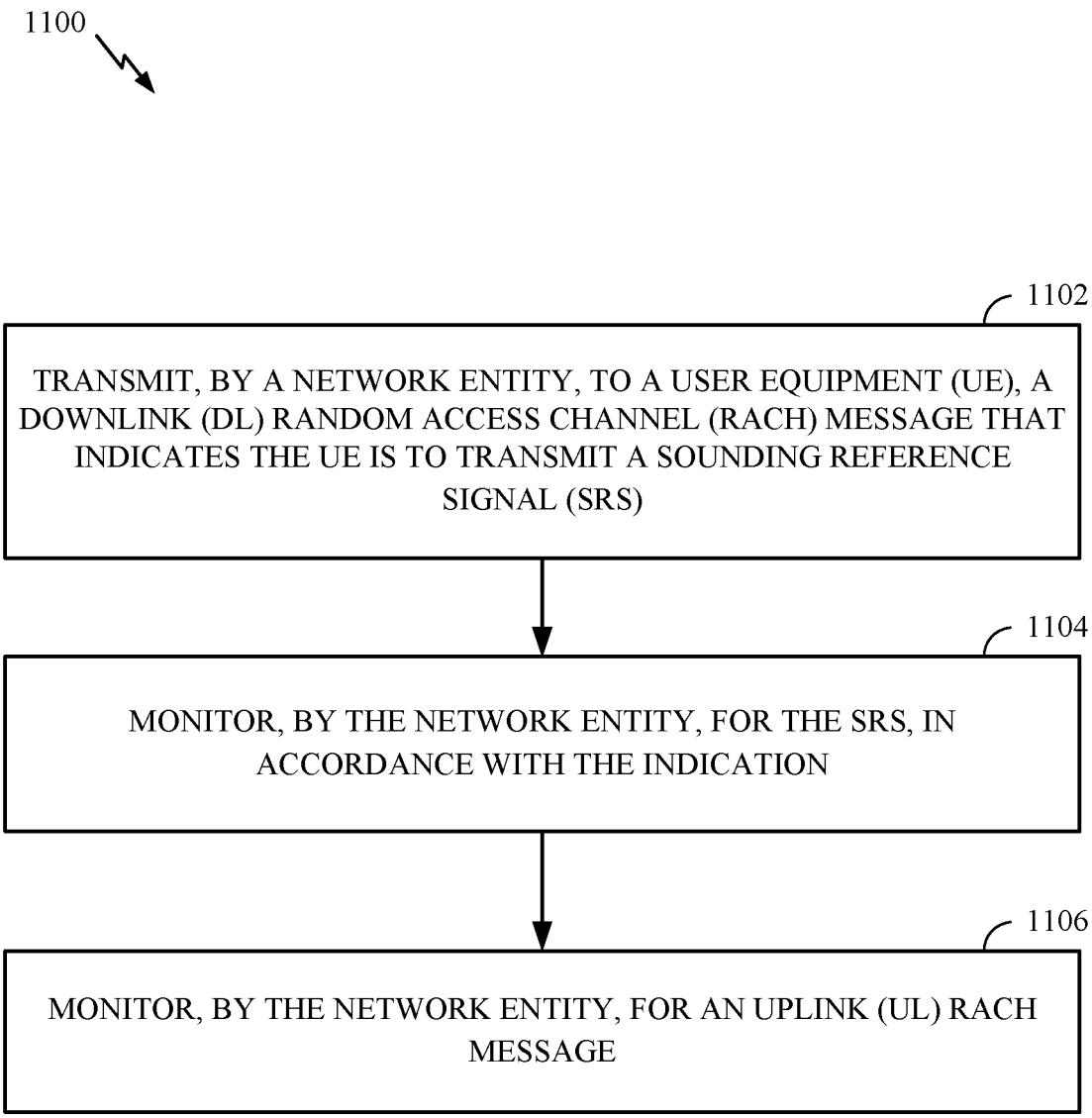
FIG. 11 is a flow diagram illustrating example operations for wireless communication by a network entity, in accordance with certain aspects of the present disclosure.

FIG. 11 illustrates example operations 1100 for wireless communication by a network entity, in accordance with certain aspects of the present disclosure. Operations 1100 may be performed, for example, by a BS, such as BS 110a in wireless communication network 100.

Operations 1100 begin, at 1102, by the network entity sending a UE a DL RACH message that indicates the UE is to transmit SRS.

At 1104, the network entity monitors for the SRS, in accordance with the indication. In certain aspects, the network entity monitors for the SRS prior to monitoring for a UL RACH message. In certain aspects, the network entity monitors for the SRS subsequent to monitoring for the UL RACH message.

At 1106, the network entity monitors for the UL RACH message.

Figure 12:
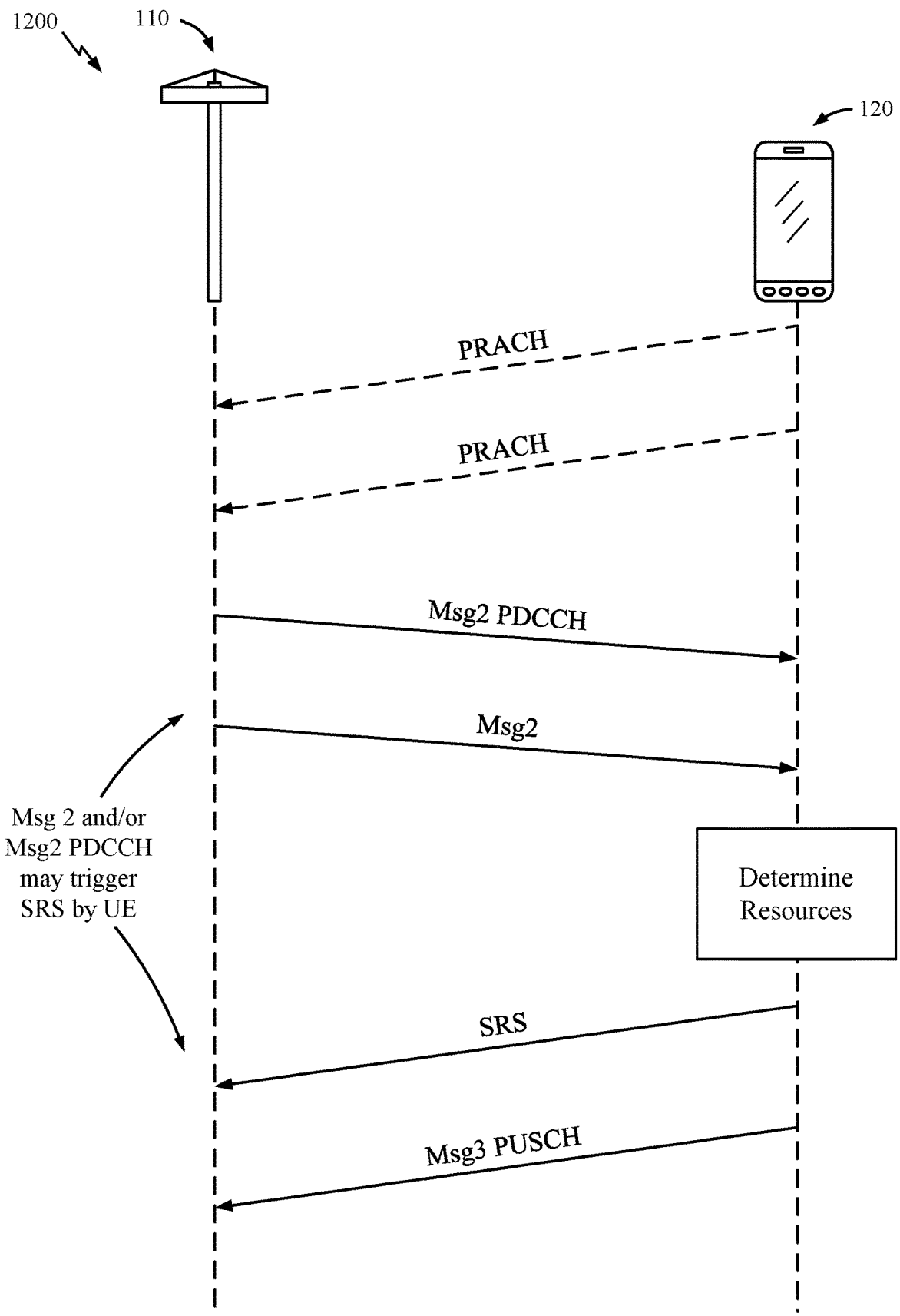
FIG. 12 illustrates a RACH procedure with a sounding reference signal (SRS) transmission, in accordance with certain aspects of the present disclosure.

Operations 1000 and 1100 of FIGS. 10 and 11 may be understood with reference to the call flow diagram 1200 of FIG. 12, which illustrates an example of how SRS may be triggered in a four-step RACH procedure.

FIG. 12 illustrates a RACH procedure with a sounding reference signal (SRS) transmission, in accordance with certain aspects of the present disclosure. As shown in FIG. 12, either Msg2 and/or Msg2 PDCCH may trigger the UE to send an SRS. Thus, in response to receiving the Msg2 (and/or Msg2 PDCCH), the UE 120 determines resources (e.g., time and frequency resources) for transmitting an SRS and transmits the SRS using the determined resources. As shown in the example embodiment of FIG. 12, the SRS may be transmitted before UE 120 transmits the PUSCH Msg3. However, in some other embodiments, the SRS may be sent after the PUSCH Msg3.

In certain aspects, time and/or frequency resources for the SRS may be scheduled explicitly by the DL RACH message (e.g., Msg2). In some cases, a one-bit flag in the DL RACH message may activate transmission of SRS by the UE, and the time and/or frequency resources (or other parameters) may then be determined implicitly by the UE. For example, time and frequency resources of the SRS may be determined based on at least one of: time and frequency resources used for Msg2 and/or Msg3 PUSCH, or simply based on a rule defined in standard specifications (e.g., 3GPP specifications).

In certain aspects, some parameters of the SRS transmission (e.g., either transmitted by the UE before or after Msg3) may be predefined, e.g., predefined in standard specifications. Additionally or alternatively, some parameters of the SRS (e.g., before Msg3) may be configured by the gNB via RMSI and/or other system information.

In some cases, the SRS may be transmitted by the UE using the same transmit port over K OFDM symbols (where K is an integer greater than zero). In this case, the gNB may apply beam sweeping for reception of the SRS, whereby different beams are used for reception of the SRS over the multiple OFDM symbols. The gNB may compare the reference signal received power (RSRP) of the received SRS on different OFDM symbols to select a refined beam for reception of Msg3 PUSCH. In particular, the gNB may select a refined beam based on the RSRP of the SRS received using different beam and use the selected refined beam for reception of the UL RACH message.

In certain aspects, the techniques described herein may be implemented based on a particular frequency range and/or subcarrier spacing (SCS). For example, the gNB may be configured to transmit (and the UE may be configured to monitor for) the DL RACH message (e.g., Msg2) that indicates the UE is to transmit the SRS only when operating in certain frequency ranges or with certain SCS. Furthermore, the techniques described herein may be applied for UEs associated with a subset of synchronization signal block (SSB) beams (e.g., according to indication by RMSI). For example, the gNB may be configured to transmit (and the UE may be configured to monitor for) the DL RACH message that indicates the UE is to transmit the SRS only when the UE is associated with certain SSB beams.

In certain aspects, scheduling of SRS by the gNB may depend on the type, method, or format of a PRACH transmission by the UE. For example, the SRS may be scheduled only for UEs that have transmitted repeated PRACHs (shown in the example embodiment of FIG. 12) and/or PRACH preamble(s) from a specific preamble subset.

In certain aspects, the gNB, after receiving the SRS, may perform measurements on the SRS. Based on the measurements, the gNB may select a precoder for transmitting a second DL RACH message.

Example Wireless Communication Device

Figure 13:
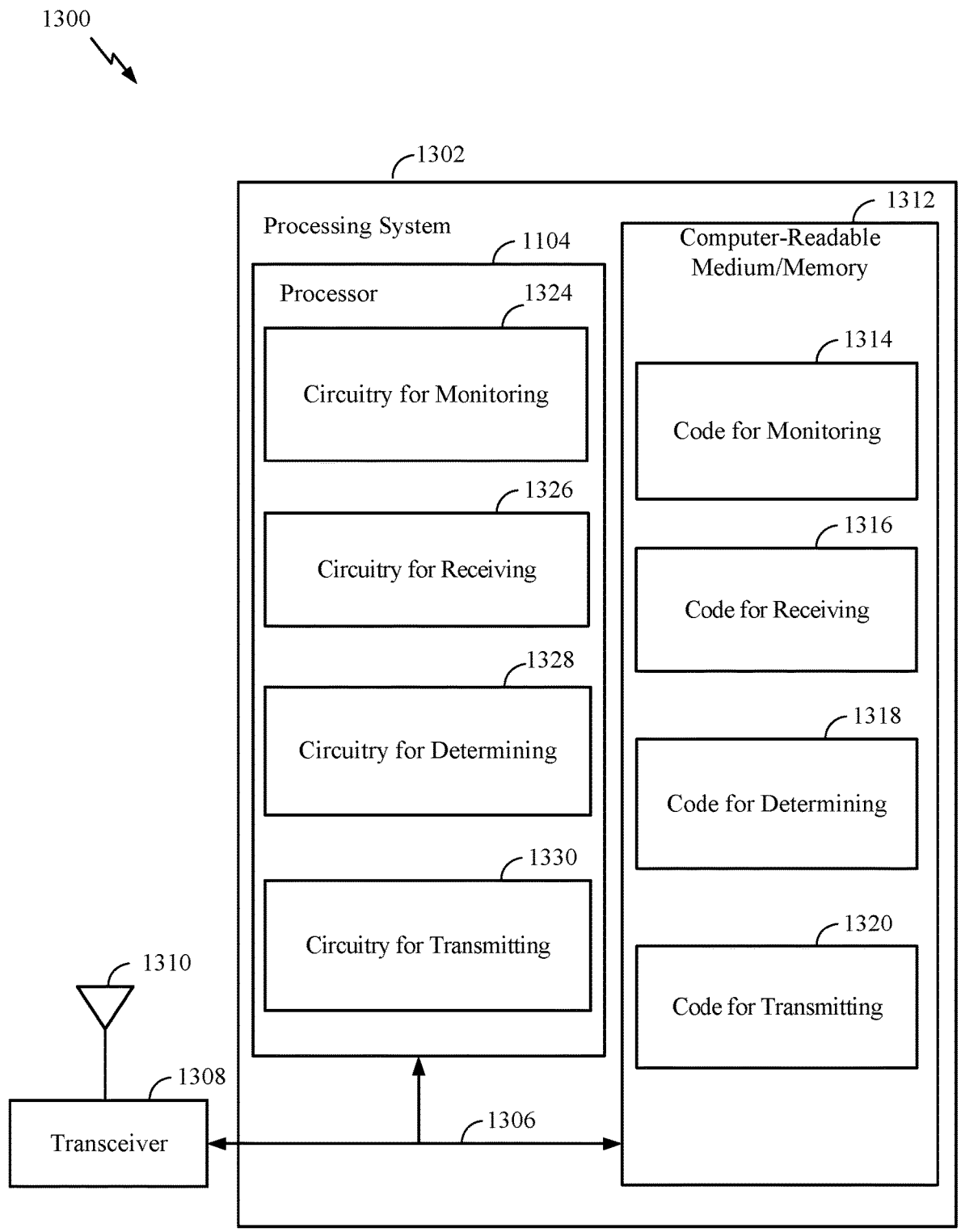
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) operable, configured, or adapted to perform operations for the techniques disclosed herein, such as the operations 1000 illustrated in FIG. 10. In some examples, communications device 1300 may be a user equipment (UE), such as UE 120a, as described with respect to FIG. 1 and FIG. 4.

Communications device 1300 includes a processing system 1302 coupled to a transceiver 1308. Transceiver 1308 is configured to transmit and receive signals for communications device 1300 via an antenna 1310, such as the various signals as described herein. Processing system 1302 may be configured to perform processing functions for communications device 1300, including processing signals received and/or to be transmitted by communications device 1300.

Processing system 1302 includes a processor 1304 coupled to a computer-readable medium/memory 1312 via a bus 1306. In certain aspects, computer-readable medium/memory 1312 is configured to store instructions (e.g., computer-executable code) that when executed by processor 1304, cause processor 1304 to perform the operations 1000 illustrated in FIG. 10, or other operations for performing the various techniques discussed herein.

In certain aspects, computer-readable medium/memory 1312 stores code 1314 (an example means for) for monitoring; code 1316 (an example means for) for receiving; code 1318 (an example means for) for determining; and code 1320 (an example means for) for transmitting.

In certain aspects, code 1314 for monitoring may include code for monitoring for a downlink (DL) random access channel (RACH) message that indicates the UE is to transmit a sounding reference signal (SRS).

In certain aspects, code 1316 for receiving may include code for receiving the DL RACH message that indicates the UE is to transmit an SRS.

In certain aspects, code 1318 for determining may include code for determining tem and frequency resources for the SRS.

In certain aspects, code 1320 for transmitting may include code for transmitting the SRS in accordance with the indication. In certain aspects, code 1320 for transmitting may include code for transmitting an uplink (UL) RACH message.

In certain aspects, processor 1304 has circuitry configured to implement the code stored in computer-readable medium/memory 1312. Processor 1304 includes circuitry 1324 (an example means for) for monitoring; circuitry 1326 (an example means for) for receiving; circuitry 1328 (an example means for) for determining; and circuitry 1330 (an example means for) for transmitting.

In certain aspects, circuitry 1324 for monitoring may include circuitry for monitoring for a DL RACH message that indicates the UE is to transmit an SRS.

In certain aspects, circuitry 1326 for receiving may include circuitry for receiving the DL RACH message that indicates the UE is to transmit an SRS.

In certain aspects, circuitry 1328 for determining may include circuitry for determining tem and frequency resources for the SRS.

In certain aspects, circuitry 1330 for transmitting may include circuitry for transmitting the SRS in accordance with the indication. In certain aspects, circuitry 1330 for transmitting may include circuitry for transmitting a UL RACH message In some cases, the operations illustrated in FIG. 10, as well as other operations described herein, may be implemented by one or more means-plus-function components. For example, in some cases, such operations may be implemented by means for monitoring, means for receiving, means for determining, and means for transmitting.

In some cases, means for monitoring and means for determining, includes a processing system, which may include one or more processors, such as receive processor 458, transmit processor 464, TX MIMO processor 466, and/or the controller/processor 480 of UE 120a illustrated in FIG. 4 and/or processing system 1302 of communications device 1300 in FIG. 13.

Transceiver 1308 may provide a means for receiving or transmitting information. Information may be passed on to other components of communications device 1300. Antenna 1310 may correspond to a single antenna or a set of antennas. Transceiver 1308 may provide means for transmitting signals generated by other components of communications device 1300.

In some cases, means for receiving or means for obtaining may include a receiver (such as receive processor 458) or antenna(s) 452 of UE 120a illustrated in FIG. 4. In some cases, means for transmitting or means for outputting may include a transmitter (such as the transmit processor 464) or antenna(s) 452 of UE 120a illustrated in FIG. 4.

Notably, FIG. 13 is just use one example, and many other examples and configurations of communications device 1300 are possible.

Figure 14:
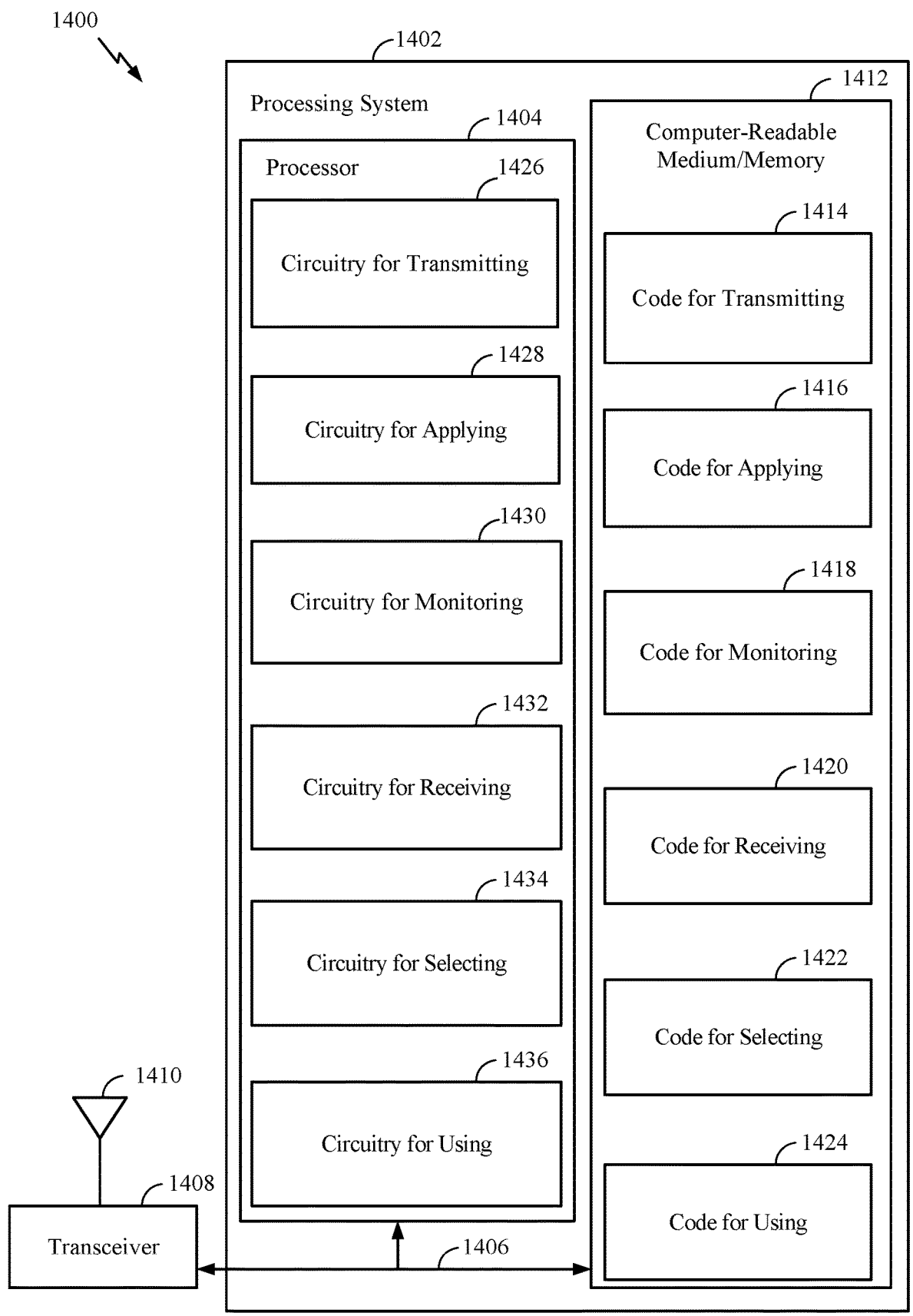
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as operations 1100 illustrated in FIG. 11. In some examples, communications device 1400 may be a network entity, such as base station (BS) 110a, as described with respect to FIG. 1 and FIG. 4.

Communications device 1400 includes a processing system 1402 coupled to a transceiver 1408. Transceiver 1408 is configured to transmit and receive signals for communications device 1400 via an antenna 1410, such as the various signals as described herein. Processing system 1402 may be configured to perform processing functions for communications device 1400, including processing signals received and/or to be transmitted by communications device 1400.

Processing system 1402 includes a processor 1404 coupled to a computer-readable medium/memory 1412 via a bus 1406. In certain aspects, computer-readable medium/memory 1412 is configured to store instructions (e.g., computer-executable code) that when executed by processor 1404, cause processor 1404 to perform operations 1100 illustrated in FIG. 11, or other operations for performing the various techniques discussed herein.

In certain aspects, computer-readable medium/memory 1412 stores code 1414 (an example means for) for transmitting; code 1416 (an example means for) for applying; code 1418 (an example means for) for monitoring; code 1420 (an example means for) for receiving; code 1422 (an example means for) for selecting; and code 1424 (an example means for) for using.

In certain aspects, code 1414 for transmitting may include code for transmitting, to a UE, a DL RACH message that indicates the UE is to transmit an SRS.

In certain aspects, code 1416 for applying may include code for applying beam sweeping whereby different beams are used for reception of the SRS over multiple OFDM symbols.

In certain aspects, code 1418 for monitoring may include code for monitoring for the SRS, in accordance with the indication. In certain aspects, code 1418 for monitoring may include code for monitoring for a UL RACH message.

In certain aspects, code 1420 for receiving may include code for receiving the SRS. In certain aspects, code 1420 for receiving may include code for receiving the UL RACH message.

In certain aspects, code 1422 for selecting may include code for selecting a refined beam based on a reference signal received power (RSRP) of the SRS received using the different beams.

In certain aspects, code 1424 for using may include code for using the selected refined beam for reception of the UL RACH message.

In certain aspects, processor 1404 has circuitry configured to implement the code stored in computer-readable medium/memory 1412. Processor 1404 includes circuitry 1426 (an example means for) for transmitting; circuitry 1428 (an example means for) for applying; circuitry 1430 (an example means for) for monitoring; circuitry 1432 (an example means for) for receiving; circuitry 1434 (an example means for) for selecting; and circuitry 1436 (an example means for) for using.

In certain aspects, circuitry 1426 for transmitting may include circuitry for transmitting, to a UE, a DL RACH message that indicates the UE is to transmit an SRS.

In certain aspects, circuitry 1428 for applying may include circuitry for applying beam sweeping whereby different beams are used for reception of the SRS over multiple OFDM symbols.

In certain aspects, circuitry 1430 for monitoring may include circuitry for monitoring for the SRS, in accordance with the indication. In certain aspects, circuitry 1430 for monitoring may include circuitry for monitoring for a UL RACH message.

In certain aspects, circuitry 1432 for receiving may include circuitry for receiving the SRS. In certain aspects, circuitry 1432 for receiving may include circuitry for receiving the UL RACH message.

In certain aspects, circuitry 1434 for selecting may include circuitry for selecting a refined beam based on an RSRP of the SRS received using the different beams.

In certain aspects, circuitry 1436 for using may include circuitry for using the selected refined beam for reception of the UL RACH message.

In some cases, the operations illustrated in FIG. 11, as well as other operations described herein, may be implemented by one or more means-plus-function components. For example, in some cases, such operations may be implemented by means for transmitting, means for applying, means for monitoring, means for receiving, means for selecting, and means for using.

In some cases, means for applying, means for monitoring, means for selecting, and means for using, includes a processing system, which may include one or more processors, such as receive processor 438, transmit processor 420, TX MIMO processor 430, and/or controller/processor 440 of BS 110a illustrated in FIG. 4 and/or processing system 1402 of communications device 1400 in FIG. 14.

Transceiver 1408 may provide a means for receiving or transmitting information. Information may be passed on to other components of communications device 1400. Antenna 1410 may correspond to a single antenna or a set of antennas. Transceiver 1408 may provide means for transmitting signals generated by other components of communications device 1400.

In some cases, means for receiving or means for obtaining may include a receiver (such as receive processor 438) or antenna(s) 434 of BS 110a illustrated in FIG. 4. In some cases, means for transmitting or means for outputting may include a transmitter (such as the transmit processor 420) or antenna(s) 434 of BS 110a illustrated in FIG. 4.

Notably, FIG. 14 is just use one example, and many other examples and configurations of communications device 1400 are possible.

EXAMPLE ASPECTS

Aspect 1: A method for wireless communications performed by a user equipment (UE), comprising receiving a downlink (DL) random access channel (RACH) message that indicates the UE is to transmit a sounding reference signal (SRS), transmitting the SRS, in accordance with the indication, and transmitting an uplink (UL) RACH message.

Aspect 2: The method of Aspect 1, wherein the UE transmits the SRS: prior to transmitting the UL RACH message; or after transmitting the UL RACH message.

Aspect 3: The method of Aspect 1 or 2, wherein the DL RACH message comprises a random access response (RAR) message or a physical downlink control channel PDCCH for the RAR message.

Aspect 4: The method of any of Aspects 1-3, wherein the DL RACH message explicitly schedules time and frequency resources for the SRS.

Aspect 5: The method of any of Aspects 1-4, wherein the indication comprises a flag in the DL RACH message that activates transmission of the SRS by the UE, and parameters for transmitting the SRS are determined implicitly based on the DL RACH message.

Aspect 6: The method of Aspect 5, wherein the parameters comprise time and frequency resources for the SRS.

Aspect 7: The method of Aspect 6, wherein the time and frequency resources for the SRS are determined based on at least one of: time and frequency resources of the DL RACH message or time and frequency resources of the UL RACH message; or one or more rules.

Aspect 8: The method of any of Aspects 5-7, wherein at least some of the parameters are predefined, configured via system information, or predefined and configured via the system information.

Aspect 9: The method of any of Aspects 1-8, wherein the UE transmits the SRS using a same transmit port over multiple orthogonal frequency division multiplexed (OFDM) symbols.

Aspect 10: The method of any of Aspects 1-9, wherein the UE transmits the SRS using a different transmit port for each of multiple orthogonal frequency division multiplexed (OFDM) symbols.

Aspect 11: The method of any of Aspects 1-10, wherein the UE is configured to monitor for the DL RACH message that indicates the UE is to transmit the SRS only when the UE is operating in certain frequency ranges or with certain subcarrier spacing (SCS).

Aspect 12: The method of any of Aspects 1-11, wherein the UE is configured to monitor for the DL RACH message that indicates the UE is to transmit the SRS only when the UE is associated with certain synchronization signal block (SSB) beams.

Aspect 13: The method of any of Aspects 1-12, wherein the UE is configured to monitor for the DL RACH message that indicates the UE is to transmit the SRS, based on a certain type, method, or format of a physical random access channel (PRACH) transmission by the UE.

Aspect 14: The method of any of Aspects 1-13, wherein the UE is configured to monitor for the DL RACH message that indicates the UE is to transmit the SRS when the UE has transmitted repeated PRACHs or a PRACH preamble from a specific preamble subset.

Aspect 15: A method for wireless communications performed by a network entity, comprising transmitting, to a UE, a DL RACH message that indicates the UE is to transmit an SRS, monitoring for the SRS, in accordance with the indication, and monitoring for an uplink (UL) RACH message.

Aspect 16: The method of Aspect 15, wherein the network entity monitors for the SRS: prior to monitoring for the UL RACH message or after monitoring for the UL RACH message.

Aspect 17: The method of Aspect 15 or 16, wherein the DL RACH message comprises a RAR message or a PDCCH for the RAR message.

Aspect 18: The method of any of Aspects 15-17, wherein the DL RACH message explicitly schedules time and frequency resources for the SRS.

Aspect 19: The method of any of Aspects 15-18, wherein the indication comprises a flag in the DL RACH message that activates transmission of the SRS by the UE, and parameters for transmitting the SRS are determined by the UE implicitly based on the DL RACH message.

Aspect 20: The method of Aspect 19, wherein the parameters comprise time and frequency resources for the SRS.

Aspect 21: The method of Aspect 20, wherein the time and frequency resources for the SRS are determined by the UE based on at least one of: time and frequency resources of the DL RACH message or time and frequency resources of the UL RACH message or one or more rules.

Aspect 22: The method of any of Aspects 19-21, wherein at least some of the parameters are: predefined, configured via system information, or predefined and configured via the system information.

Aspect 23: The method of any of Aspects 15-22, further comprising: receiving the SRS, performing measurements on the SRS, and selecting, based on measurements, a precoder for transmitting a second DL RACH message.

Aspect 24: The method of any of Aspects 15-23, further comprising applying beam sweeping whereby different beams are used for reception of the SRS over multiple OFDM symbols, selecting a refined beam based on a reference signal received power (RSRP) of the SRS received using the different beams, and using the selected refined beam for reception of the UL RACH message.

Aspect 25: The method of any of Aspects 15-24, wherein the network entity is configured to transmit the DL RACH message that indicates the UE is to transmit the SRS only when operating in certain frequency ranges or with certain subcarrier spacing (SCS).

Aspect 26: The method of any of Aspects 15-25, wherein the network entity is configured to transmit the DL RACH message that indicates the UE is to transmit the SRS only when the UE is associated with certain synchronization signal block (SSB) beams.

Aspect 27: The method of any of Aspects 15-26, wherein the network entity is configured to transmit the DL RACH message that indicates the UE is to transmit the SRS, based on a certain type, method, or format of a physical random access channel (PRACH) transmission by the UE.

Aspect 28: The method of any of Aspects 15-27, wherein the network entity is configured to transmit the DL RACH message that indicates the UE is to transmit the SRS when the UE has transmitted repeated PRACHs or a PRACH preamble from a specific preamble subset.

Clause 29: An apparatus, comprising: at least one processor; and a memory coupled to the at least one processor, the memory including instructions executable by the at least one processor to cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations and techniques described herein and illustrated in FIGS. 10-12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

The invention claimed is:

1. A method for wireless communications performed by a user equipment (UE), comprising:
receiving a downlink (DL) random access channel (RACH) message that indicates the UE is to transmit a sounding reference signal (SRS), wherein the DL RACH message comprises a flag in the DL RACH message that activates transmission of the SRS by the UE, and wherein parameters for transmitting the SRS are determined implicitly based on the DL RACH message;
transmitting the SRS in accordance with the DL RACH message; and
transmitting an uplink (UL) RACH message after transmitting the SRS.

2. The method of claim 1, wherein the DL RACH message comprises a random access response (RAR) message or a physical downlink control channel (PDCCH) for the RAR message.

3. The method of claim 1, wherein the parameters comprise time and frequency resources for the SRS.

4. The method of claim 3, wherein the time and frequency resources for the SRS are determined based on at least one of:
time and frequency resources of the DL RACH message or time and frequency resources of the UL RACH message; or
one or more rules.

5. The method of claim 1, wherein at least some of the parameters are:

predefined, configured via system information, or predefined and configured via the system information.

6. The method of claim 1, wherein the UE transmits the SRS using a same transmit port over multiple orthogonal frequency division multiplexed (OFDM) symbols.

7. The method of claim 1, wherein the UE transmits the SRS using a different transmit port for each of multiple orthogonal frequency division multiplexed (OFDM) symbols.

8. The method of claim 1, wherein the UE is configured to monitor for the DL RACH message that indicates the UE is to transmit the SRS only when the UE is operating in certain frequency ranges or with certain subcarrier spacing (SCS).

9. The method of claim 1, wherein the UE is configured to monitor for the DL RACH message that indicates the UE is to transmit the SRS only when the UE is associated with certain synchronization signal block (SSB) beams.

10. The method of claim 1, wherein the UE is configured to monitor for the DL RACH message that indicates the UE is to transmit the SRS, based on a certain type, method, or format of a physical random access channel (PRACH) transmission by the UE.

11. The method of claim 1, wherein the UE is configured to monitor for the DL RACH message that indicates the UE is to transmit the SRS when the UE has transmitted repeated PRACHs or a PRACH preamble from a specific preamble subset.

12. An apparatus for wireless communication by a user equipment (UE), comprising:

memory; and one or more processors coupled to the memory, the one or more processors being configured, individually or collectively, to:

receive a downlink (DL) random access channel (RACH) message that indicates the UE is to transmit a sounding reference signal (SRS), wherein the DL RACH message comprises a flag in the DL RACH message that activates transmission of the SRS by the UE, and wherein parameters for transmitting the SRS are determined implicitly based on the DL RACH message;

transmit the SRS in accordance with the DL RACH message; and transmit an uplink (UL) RACH message after transmission of the SRS.

13. A method for wireless communications performed by a network entity, comprising:

transmitting, to a user equipment (UE), a downlink (DL) random access channel (RACH) message that indicates the UE is to transmit a sounding reference signal (SRS), wherein the DL RACH message comprises a flag in the DL RACH message that activates transmission of the SRS by the UE, and wherein parameters for transmitting the SRS are determined by the UE implicitly based on the DL RACH message;

monitoring for the SRS, in accordance with the DL RACH message; and monitoring for an uplink (UL) RACH message after monitoring for the SRS.

14. The method of claim 13, wherein the DL RACH message comprises a random access response (RAR) message or a physical downlink control channel (PDCCH) for the RAR message.

15. The method of claim 13, wherein the parameters comprise time and frequency resources for the SRS.

16. The method of claim 15, wherein the time and frequency resources for the SRS are determined by the UE based on at least one of:

time and frequency resources of the DL RACH message or time and frequency resources of the UL RACH message; or one or more rules.

17. The method of claim 13, wherein at least some of the parameters are:

predefined, configured via system information, or predefined and configured via the system information.

18. The method of claim 13, further comprising:

receiving the SRS;

performing measurements on the SRS; and selecting, based on the measurements, a precoder for transmitting a second DL RACH message.

19. The method of claim 13, further comprising:

applying beam sweeping whereby different beams are used for reception of the SRS over multiple OFDM symbols;

selecting a refined beam based on a reference signal received power (RSRP) of the SRS received using the different beams; and using the selected refined beam for reception of the UL RACH message.

20. The method of claim 13, wherein the network entity is configured to transmit the DL RACH message that indicates the UE is to transmit the SRS only when operating in certain frequency ranges or with certain subcarrier spacing (SCS).

21. The method of claim 13, wherein the network entity is configured to transmit the DL RACH message that indicates the UE is to transmit the SRS only when the UE is associated with certain synchronization signal block (SSB) beams.

22. The method of claim 13, wherein the network entity is configured to transmit the DL RACH message that indicates the UE is to transmit the SRS, based on a certain type, method, or format of a physical random access channel (PRACH) transmission by the UE.

23. The method of claim 13, wherein the network entity is configured to transmit the DL RACH message that indicates the UE is to transmit SRS when the UE has transmitted repeated PRACHs or a PRACH preamble from a specific preamble subset.

24. An apparatus for wireless communication by a network entity, comprising:

memory; and one or more processors coupled to the memory, the one or more processors being configured, individually or collectively, to:

transmit, to a user equipment (UE), a downlink (DL) random access channel (RACH) message that indicates the UE is to transmit a sounding reference signal (SRS), wherein the DL RACH message comprises a flag in the DL RACH message that activates transmission of the SRS by the UE, and wherein parameters for transmitting the SRS are determined by the UE implicitly based on the DL RACH message;

monitor for the SRS, in accordance with the DL RACH message; and monitor for an uplink (UL) RACH message after the SRS is monitored for.

* * * * *